United States Patent [19]

Burke et al.

[11] Patent Number: 4,677,656
[45] Date of Patent: Jun. 30, 1987

[54] TELEPHONE-RADIO INTERCONNECT SYSTEM

[75] Inventors: Timothy M. Burke; Thomas F. Shirley, Jr., both of Fort Worth; Eric R. Schorman, Bedford; Eric S. Goldsmith, Watauga, all of Tex.

[73] Assignee: Motorola, Inc., Schaumburg, Ill.

[21] Appl. No.: 622,332

[22] Filed: Jun. 19, 1984

[51] Int. Cl.$^4$ .............................................. H01Q 7/04
[52] U.S. Cl. ...................................... 379/63; 155/38; 379/58
[58] Field of Search ................ 179/2 E, 2 EA, 2 EB, 179/2 EC; 455/38; 340/311.1, 825.44, 825.45

[56] References Cited

U.S. PATENT DOCUMENTS

| | | | |
|---|---|---|---|
| 4,007,422 | 2/1977 | Da Silva | 325/55 |
| 4,012,596 | 3/1977 | West, Jr. et al. | 179/2 EA |
| 4,012,597 | 3/1977 | Lynk, Jr. et al. | |
| 4,071,711 | 1/1978 | Beaupre et al. | |
| 4,075,564 | 2/1978 | Masur et al. | 325/55 |
| 4,178,475 | 12/1979 | Taylor et al. | |
| 4,220,820 | 9/1980 | Mallien, II | |
| 4,284,979 | 8/1981 | Flanders et al. | 340/359 |
| 4,352,955 | 10/1982 | Kai et al. | |
| 4,400,585 | 8/1983 | Kaman et al. | |
| 4,415,771 | 11/1983 | Martinez | 179/5 R |
| 4,424,514 | 1/1984 | Fennel et al. | 340/825.52 |
| 4,574,163 | 3/1986 | Zato | 179/2 EA |

OTHER PUBLICATIONS

Mobile Telephone Control Unit Design Guidelines for the High Capacity Mobile Telecommunications System; J. T. Walker; 28th IEEE Vehicular Technology Conference; Mar. 1978; pp. 56-61.
Advanced Mobile Phone Service: Control Architecture; Z. C. Fluhr and P. T. Porter; Bell System Technical Journal; vol. 58, No. 1; Jan. 1979; pp. 43-69.
Advanced Mobile Phone Service: A Subscriber Set for the Equipment Test; R. E. Fisher; Bell System Technical Journal; vol. 58, No. 1; Jan. 1979; pp. 123-143.
Advanced Mobile Phone Service: Cell-Site Hardware; N. Ehrlich, R. E. Fisher, and T. K. Wingard; Bell System Technical Journal; vol. 58; No. 1; Jan. 1979; pp. 153-155, 158-166.
How Do You Spell Simplex Interconnect Signaling Relief? D-I-G-I T-O-U-C-H; Technical Descriptions; Textel Laboratories.
Tex Tel's Key-Tone & Modified Vox; Technical Description; Textel Laboratories.

Primary Examiner—Robert G. Lev
Attorney, Agent, or Firm—Raymond A. Jenski

[57] ABSTRACT

A telephone interconnect system for a two-way radio communications system is disclosed. A telephone patch interconnect unit accepts dialed digits from a telephone line, encodes them into a data packet, and couples the data packet to a fixed transceiver for transmission to remote units. A remote unit with a digit sequence identification matching the received and decoded dialed digit activates an alert. A remote unit may generate and store digits corresponding to a desired telephone number. The digits are subsequently encoded into a data packet and transmitted to the telephone patch interconnect unit. The interconnect unit accepts, acknowledges and decodes the data packet and couples the resulting digits to the telephone line.

37 Claims, 25 Drawing Figures

ONE PACKET TIME = PT

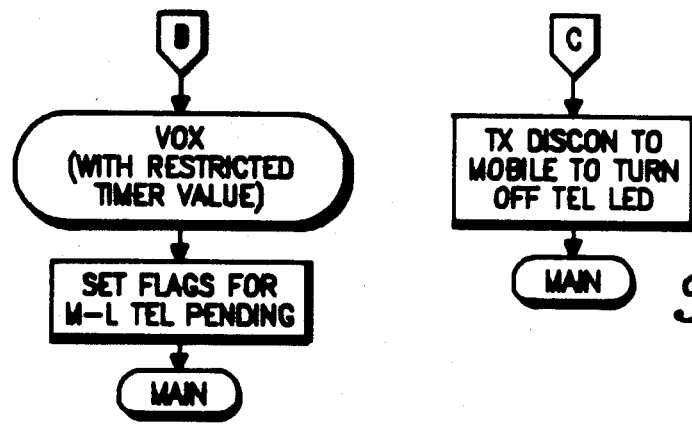
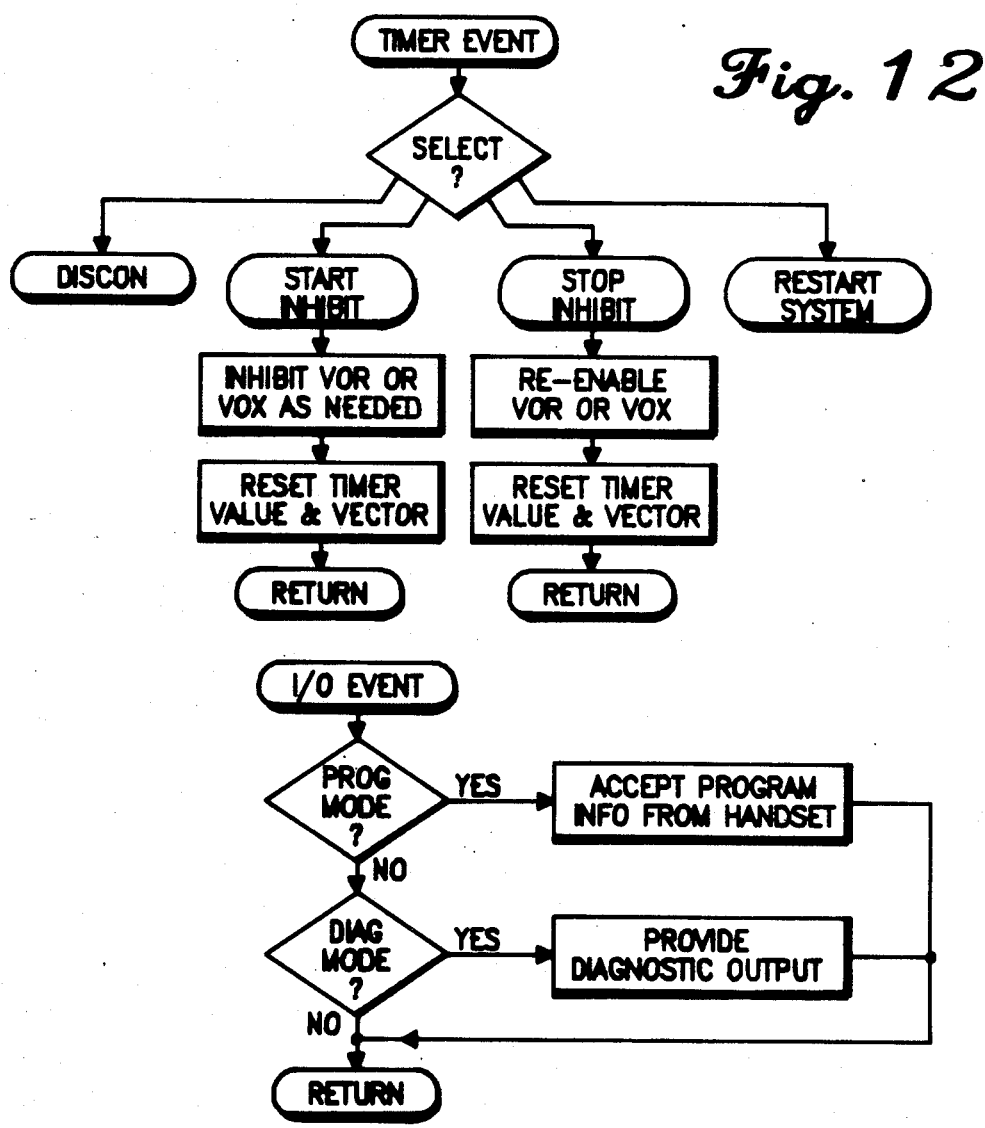
Fig. 11c
Fig. 12

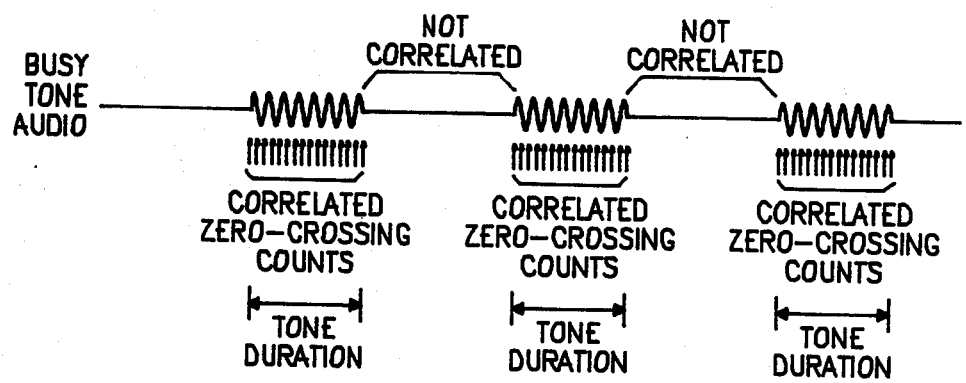
*Fig. 18*
*Fig. 19*
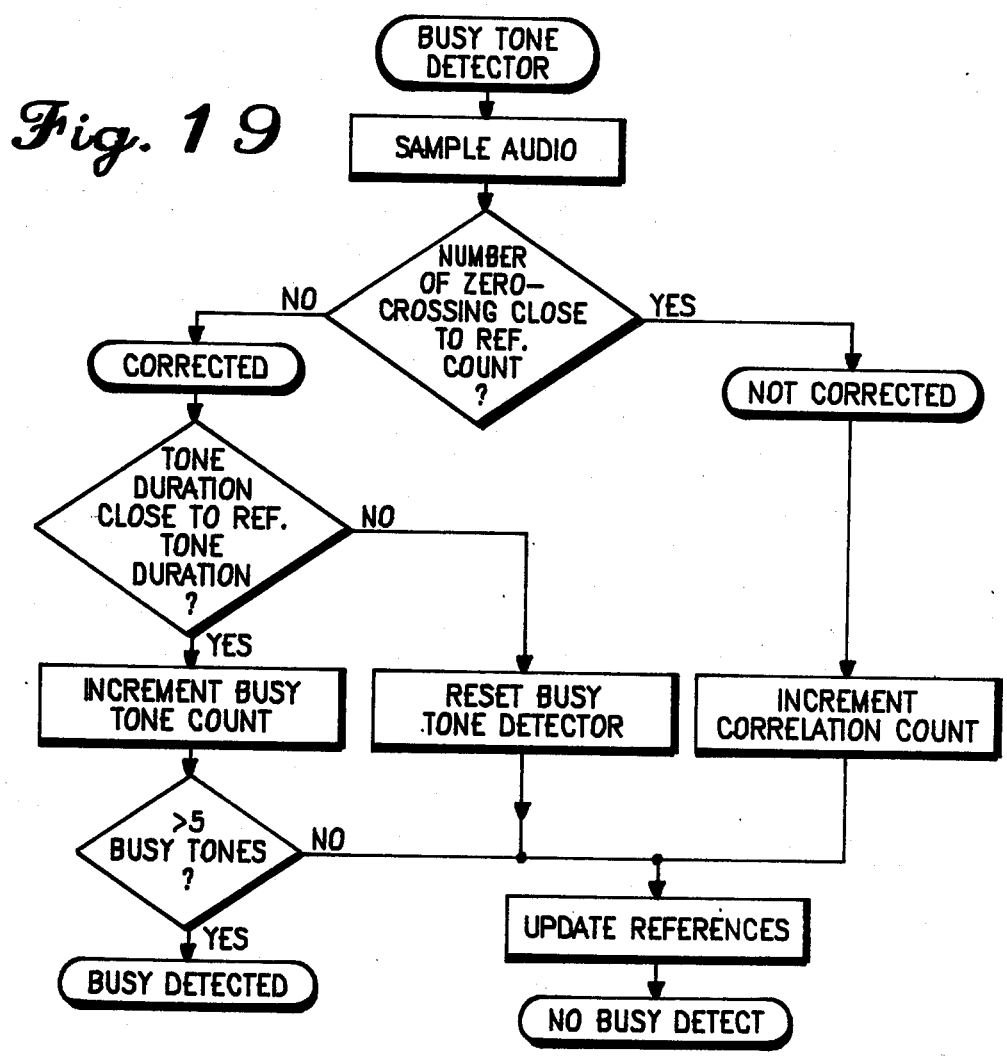

TELEPHONE-RADIO INTERCONNECT SYSTEM

Background of the Invention

This invention relates generally to telephone interconnect devices and more specifically to telephone patches and associated control devices for a two-way radio system.

Interconnection, or phone patching as it is commonly called, is the connection of a radio system to the public service telephone network (PSTN) or a private branch exchange (PBX). However, operation of the phone patch is not the same as that experienced on a standard telephone or in the domestic mobile radiotelephone service provided by the telephone company or by radio common carriers (RCC). The mobile telephone system is a full duplex system that has many of the characteristics of and may be used in the same manner as a standard telephone. The phone patch system, however, is either simplex or half-duplex on a single channel and generally requires significant involvement by the radio user or an intermediary such as a radio dispatcher to establish and maintain a connection with the telephone system.

The radio systems which employ phone patches usually have a plurality of mobile units many of which are associated with each other in groups, and a fixed radio transceiver or several fixed radio transceivers located at a favorable propagation site and under the control of one or more dispatchers who may be located some distance away. It is the function of the dispatcher to communicate with the mobile users and to regulate and control the radio traffic on the radio system and occasionally connect a radio user to a telephone line. To accomplish this, the dispatcher must lift the receiver of his telephone instrument, dial the desired number, and manually activate a switch which accomplishes the connection of the radio user and the landline party. The dispatcher must monitor the call and, in simplex systems where the fixed transceiver and the mobile transceivers utilize a single frequency for both receive and transmit, he must manually key the fixed transceiver transmitter when the land party wishes to speak and de-key the fixed site transmitter when the land party wishes to listen. At the conclusion of the call, the dispatcher must manually deactivate the phone patch and hang up the telephone.

In half-duplex systems where a channel consisting of two frequencies is available for the fixed transceiver and the mobile transceivers, the fixed transmitter can be locked in the transmit mode for the duration of the call thereby relieving the dispatcher of the necessity of keying and de-keying the transmitter. The phone user can always talk to the mobile transceiver but the mobile transceiver user must key and de-key the transmitter in order to talk to the phone user. Thus, the mobile user cannot be interrupted by the phone user while the mobile transmitter is keyed.

Even with the aforementioned inconveniences, phone patches have flourished. However, a very useful device like a phone patch is not always possible. By Federal Communications Commission (FCC) regulation, phone patch use at frequencies below 800 MHZ is not allowed within 75 miles of the 25 largest metropolitan areas. Additionally, the sharing of a telephone line among several users is not allowed; each user on a fixed transceiver must have a separate telephone line.

Non-trunked systems above 800 MHz are allowed phone patches only at the control point and only with the control point operator or dispatcher present. These regulations tend to limit the phone patch to simplex operation only and reduce the flexibility of automatic operation. 800 MHz trunked systems, such as that described in U.S. Pat. No. 4,012,597 assigned to the assignee of the present application, are required to provide service to large numbers of users. To do this, the systems must trunk or share a number of frequencies among the users relying on the probability that not all users communicate at the same time and for the same duration of message. Since telephone calls consume significantly more time and effort than other radio calls, most trunked system owners do not allow phone patches on their system. The off-peak service hours, however, could be used to service telephone calls if reliable and automatic equipment were available.

Several different manufacturers make telephone interconnect systems for the land mobile radio market. The vast majority use DTMF (touch-tone ®) or other tone signalling for control and selective call operation. Although tones and DTMF can be sent through a radio channel many compromises are required to effect a reliable signalling system. A typical radio channel is much noisier than a telephone line, particularly in weak signal areas. A frequency modulation receiver can produce noise strong enough to false a DTMF decoder when the radio signal is weak whereas a telephone system rarely experiences noise at voice levels. A DTMF decoder that can decode a 40 millisecond tone pulse typically falses six times or more in less than 30 minutes. To reduce all types of falsing (voice, noise, and cross-code) longer tone times are needed. Longer times are also needed for better sensitivity at the same falsing rate. However, longer tone times increase the amount of time required to dial a telephone number and increase the probability that a signal dropout during a long tone will be interpreted as a repeated number.

Automatic interface equipment which currently exists can provide fixed transmitter keying/dekeying, telephone line seizure and redial of mobile tone or DTMF digits, and selective mobile calling but does not provide a land-mobile coordination that simplifies the initial equipment set-up, yields an easy and automatic call processing, and reduces the effort of a dispatcher in overseeing of a telephone call. Consequently, a long standing need is felt for a telephone interconnect system which will accomplish telephone signalling in an efficient and reliable manner and which will reduce the burden of phone patch operation for the radio user and dispatcher.

SUMMARY OF THE INVENTION

Therefore, it is an object of this invention to provide a single channel telephone interconnect system with a reliable signalling method.

It is a further object of this invention to reduce the human intervention necessary for the operation of the telephone interconnect system.

Accordingly, these and other objects are achieved in the present invention of a telephone interconnect system. This system, employed in a two-way radio system, provides mobile radio users access to the telephone system. The fixed end equipment includes a fixed radio transceiver and a phone patch which accepts dialed digits from the telephone line, converts them into a data packet, and couples them to the radio transceiver for transmission when the radio channel is unoccupied. The phone patch also accepts data packets received by the fixed transceiver, decodes them, transmits an acknowledge, and couples the digits to the telephone line to dial a number.

A unique digit sequence identifies each mobile unit in the above two-way system. Each mobile unit decodes the data packet transmitted from the phone patch to determine if the dialed digits match its unique digit sequence. A match causes an alert to be activated and a telephone conversation may ensue. The mobile unit may also generate and store digits corresponding to a desired telephone number. These digits are encoded into a datapacket and transmitted to the phone patch. If an acknowledge is not received from the phone patch, the data packets are retransmitted a predetermined number of times.

BRIEF DESCRIPTION OF THE DRAWINGS

FIGS. 11a–11c are a flowchart of the Data Decode subroutine of the flowchart of FIG. 10.

FIG. 12 is a flowchart for the Timer Event and I/O Event subroutines of FIG. 10.

FIG. 18 shows an amplitude versus time graph of the audio frequency tone of the busy tone signal from the telephone network. Zero crossing counts are shown correlated to the busy tone.

FIG. 19 is a flowchart of the Busy Tone Detector routine of the phone patch interconnect unit.

DETAILED DESCRIPTION OF THE PREFERRED EMBODIMENT

Figure 1:
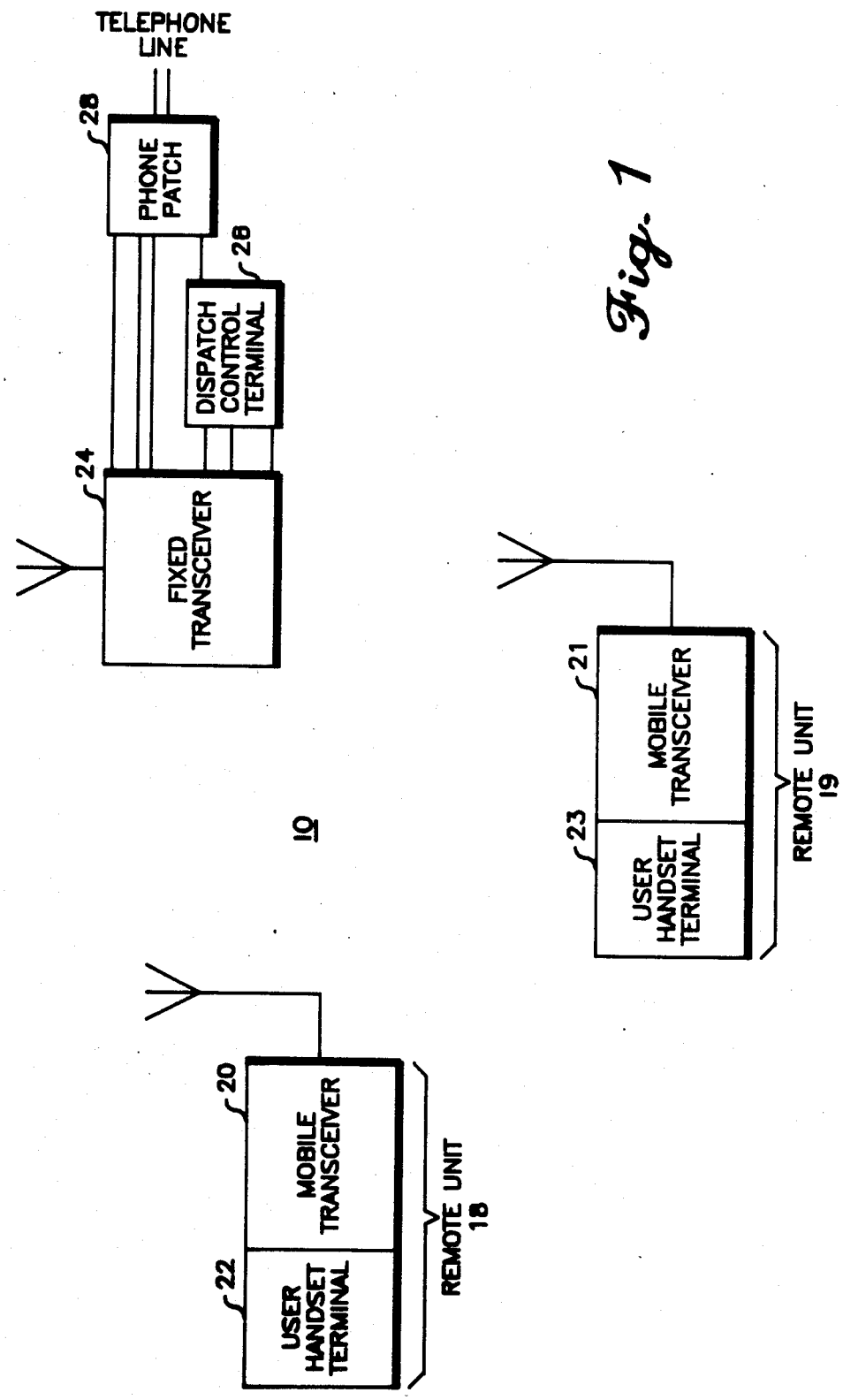
FIG. 1 depicts a two-way radio system with two of a possible plurality of remote units and including a phone patch interconnect unit.

A conventional two-way radio system 10 is depicted in FIG. 1 which shows two of a possible plurality remote units 18, 19 (each remote unit having a mobile transceiver 20, 21 and a handset 22, 23) and a fixed transceiver 24. A dispatcher control terminal 26 exercises control over the receiver and transmitter of the fixed transceiver 24 and communicates with remote units 18 and 19 among others. Additionally, a phone patch interconnect unit 28 is coupled to the fixed transceiver 24 and dispatcher control terminal 26 in a conventional fashion to allow audio from the receiver of the fixed transceiver 24 to be coupled to the telephone line and audio from the telephone line to be coupled to the transmitter of fixed transceiver 24. Connected to each of the mobile transceivers 20 and 21 is a portable handset, 22 and 23 respectively, that replaces the normal microphone of the radio. Each handset contains all of the neccessary electronics and operator interface mechanisms to perform all other radio indication and control functions. It also provides a 3×5 keypad through which the radio user may process a telephone call.

The phone patch interconnect unit 28 provides a telephone interface, control logic, voice operated transmit (VOX) circuit, packet signalling encoder/decoder, basic timing, and management functions. A detailed description of the packet signalling system used by the preferred embodiment of the interconnect unit 28 and of the handset 22, 23 can be found in U.S. Pat. Nos. 402,682 and 402,689 and 402,690 filed in behalf of Burke, et al. on July 28, 1982 and assigned to the assignee of the present invention. Other packet or burst protocols may be used, however, to achieve a similar signalling effectiveness. A trunked system protocol for interconnection mobile radio equipment to the telephone system is disclosed in U.S. Pat. No. 599,319 in behalf of Coombes (Communications System With Voice Priority for Remote Stations) filed April 12, 1984 and assigned to the assignee of the present application.

This microprocessor compatible signalling system has been designed for good sensitivity and extremely low falsing on a mobile radio channel. It has a much higher information rate than the DTMF signalling used in other phone patch systems. The system allows both the handset 22, 23 and the phone patch interconnect unit 28 to store the telephone number digits as they are dialed and then forward them in a burst of packets when the channel is clear. This buffering of the dialed digits gives the dialing user the opportunity to clear and redial immediately if a mistake is made. Furthermore, the packet signalling allows a positive "handshake" for most transmitted messages and commands, and provides automatic retransmission if a handshake is missed.

Figure 2:
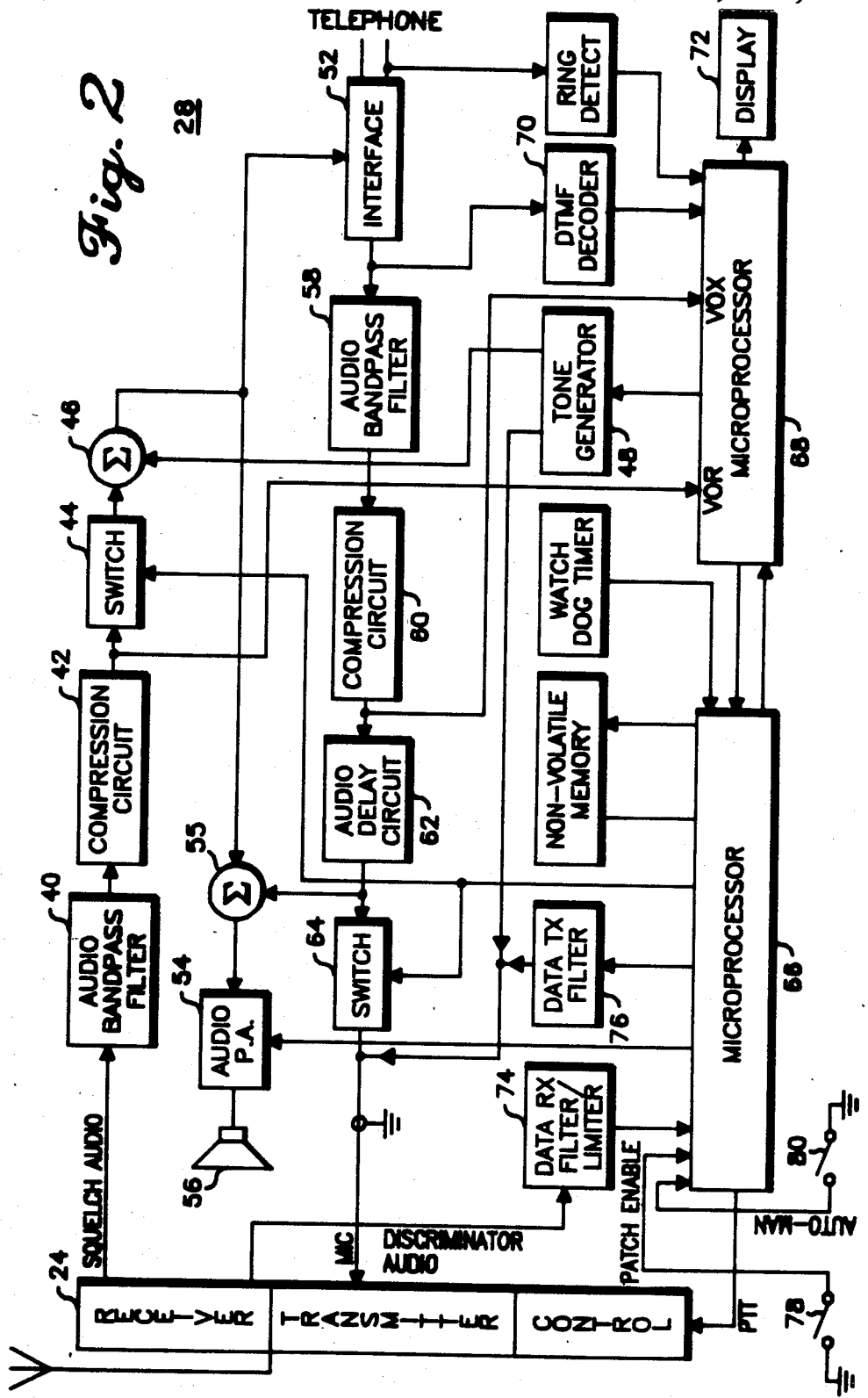
FIG. 2 is a block diagram of the phone patch interconnect unit of FIG. 1 and includes the connections to a fixed transceiver.

A detailed block diagram of the phone patch interconnect unit 28 is presented in FIG. 2. A fixed transceiver 24 is shown which receives signals from a mobile transceiver, 18, 19, detects the signals, and passes the audio to a conventional bandpass filter 40. The function of audio band pass filter 40 is to reject low frequency tones and data which fall below the audio band of 300 to 3000 Hz and to reject noise above the band. A typical compression circuit 42 provides a constant audio level for the telephone line. A transitorized audio control switch 44 controls direction of message flow and feeds an audio summer 46 where it is combined with the output of tone generator 48. This tone generator 48 can be constructed of a Mitel 5089 integrated circuit to provide both single tone and DTMF generation. The summed output is connected to a telephone interface 52, which is consistent with Federal Communications Commission Part 68, for output to the telephone line. A second output from the summer 46 is coupled to a transistorized audio power amplifier 54 through summer 55 to drive a speaker 56 and provide, if desired, an audio output for the dispatcher.

Audio input from the telephone line is coupled through interface 52 to a conventional audio band pass filter 58 where frequencies and tones above and below the audio band are removed. A three-state compression circuit 60 follows the audio band pass 58 and compensates wide variations in signal level received from the telephone line. The first state of the compression circuit 60 is an expansion state wherein very low levels are amplified to bring them to levels capable of modulating the transmitter at full deviation. The second or linear state provides little gain to an adequate signal and the third state limits the level of a strong signal such that the transmitter is not over deviated. The audio is then coupled through an audio delay circuit 62, which will be described later, a conventional audio switch 64, and then to the transmitter of transceiver 24. The circuits previously described for the phone patch interconnect unit 28 are familiar to those skilled in the art and constitute only part of the present invention.

In the preferred embodiment, phone patch interconnect unit 28 is controlled by a pair of microprocessors operating in a master-slave arrangement. An MC6803 microprocessor such as that manufactured by Motorola Inc. may be the primary controller 66 which maintains system control, system timing, and packet signalling encoding and decoding. The slave microprocessor 68 may be an MC6805R2 manufactured by Motorola Inc. and is responsible for DTMF tone control, digit storage, transmitter and receiver control, telephone line ring detection and telephone number digit display. Peripheral to slave microprocessor 68 is a tone generator 48 which generates DTMF tones at the command of microprocessor 68 and uses telephone number digits stored in microprocessor 68. The tone generator 48 will also generate single tones to be transmitted by transceiver 24 at the request of microprocessor 68. Digits are stored in microprocessor 68 either following the decoding of received phone patch handset data packets by master microprocessor 66 or by the detection of DTMF tones from the telephone line by DTMF decoder 70. Microprocessor 68 also presents the telephone number dialed on the phone patch handset in a mobile initiated call or the mobile number dialed on the telephone line in a land initiated call on display 72. The display 72 in this embodiment is a seven-segment, five digit vacuum fluorescent tube display such as those offered by Futaba driven by a single chip display controller like a National MM5448N.

Peripheral to the master microprocessor 66 is a data receiver filter limiter 74 which accepts data packets from the transceiver 24 receiver discriminator (not shown), filters out undesirable noise, and then squares up the data transitions for input to microprocessor 66. Master microprocessor 66 also generates packet data based on telephone numbers and instructions received from slave microprocessor 68. These transmit data packets are processed by data transmit filter 76 before being input to the transmitter of transceiver 24.

The interconnect unit 28 has the capacity for two telephone lines to be connected to it and can distinguish between them. A mobile unit may select either line to be connected. If desired, one line may be designated a priority line which will, when ringing is detected, interrupt and disconnect a call established on the second line.

External control of the phone patch interconnect unit 28 is accomplished by the dispatcher who may enable or disable the unit with patch enable switch 78 and may select automatic or manual operation with auto-manual switch 80.

Three basic modes of interconnect are achieved by the phone patch interconnect unit 28: manual, control point supervised, and mobile supervised. Of the three the manual phone patch operation is the least sophisticated. When the local telephone rings, the dispatcher answers the phone and determines if a patch is needed. If so, the dispatcher activates the patch enable switch 78 allowing the interconnect unit to seize the telephone line. At this time either the dispatcher or the land user may enter DTMF digits on the phone to select the proper mobile unit. The digits are decoded by DTMF decoder 70 and stored in the internal RAM of microprocessor 68. Upon completion of dialing, the microprocessor 68 transfers the stored digits to microprocessor 66 for encoding into data packets and transmission to the desired mobile unit. When the mobile unit responds, the dispatcher may then announce to both parties that the phone patch is connected. The dispatcher monitors both directions of the conversation on speaker 56 and turns off the phone patch interconnect unit 28 when the conversation is finished. A similar process occurs on a mobile originated call.

If the patch is operating on a simplex radio channel a voice operated transmit (VOX) protocol is followed. A VOX implemented in the software of microprocessor 68 detects the presence of speech and keys the transmitter so that the speech is transmitted. The VOX of the present invention avoids the noise falsing and initial speech clipping found in previous VOX circuits and is achieved in a software algorithm which dynamically sets the VOX attack time, hold time and threshold values. The specific values enumerated herein are for a particular preferred embodiment and should not be considered as limiting the invention thereto. When a remote unit initiates a telephone call, a phone number is dialed via a telephone exchange. Subsequently, many clicks and pops typically occur while the call is being connected. To avoid keying and dekeying the transmitter unnecessarily, the telephone patch VOX attack time is increased to 100 msec. This time, in the preferred embodiment, allows clicks and pops, which typically have a duration of less than 100 msec, to be ignored. The attack time is reset to its normal time of 15 msec when the remote unit is keyed at the beginning of conversation.

The telephone patch VOX hold time (the time the transmitter is held keyed after speech stops) is dynamically adjustable to initially reduce the time that the land user must wait for a reply after the telephone is answered. This is significant because if the normal hold-time were used at this time (typically 1 to 3 seconds) then the land user may either hang up since no response would be immediately forthcoming or the user may say "Hello" again which would keep the fixed transmitter keyed, thereby preventing the mobile from responding. Therefore, the holdtime is automatically reduced to 250 msec at the beginning of a mobile initiated phone call until the mobile responds.

In high noise environments VOX circuits tend to keep the transmitter constantly keyed since there is a continuous signal present that is greater than the VOX threshold. The microprocessor 68 overcomes this problem by dynamically adjusting the VOX threshold to match the current signal environment.

The threshold is adjusted every 500 msec. This is accomplished by computing the average magnitude of the signal over a 10 msec. window. The smallest average magnitude of 50 windows is used to determine the new threshold.

This process of threshold establishment sets the threshold according to the true background level which is measured during the natural pauses between words. Other methods may set the threshold to a less than optimum value since they do not distinguish between background noise and desired signal.

When busy tones occur in a simplex telephone interconnect, they cause the VOX to detect signal and keep the transmitter keyed, thereby preventing the mobile user from disconnecting the phone call. This problem is overcome in microprocesser 68 by the detection of busy tones and the automatic disconnection of the call.

The tone detection algorithm uses zero-crossing information that is obtained by sampling the signal at 6.4 Khz with an internal analog to digital converter. When the number of zero-crossings counted in a 10 msec. window differs significantly from previous counts, a "no-correlation" register is incremented, and the current count is saved in a "zero-crossing-compare" register (the value against which future counts will be compared when testing for correlation). When the count does not significantly differ from the "zero-crossing-compare" register a "correlation" register is incremented. This register continues to be incremented for each window that is not significantly different but when the first non-correlated window is observed, the contents of the "correlation" register (which contains the duration of the tone detect) is compared against the previous tone duration. When 5 tone detects occur that have little difference in their durations, a busy detect occurs. The A/D converter has quantizing errors which can cause erroneous zero-crossing detects when little or no signal is present. This problem is overcome by performing software hysteresis that rejects samples that are within a zone that is $+/-2$ quantization levels from the zero level.

If a squelch indication is not available from the receiver, then squelched audio is used as the indicator for voice operated receive (VOR) operation. Audio activity on the radio channel is coupled to microprocessor 68 via the voice operated receiver (VOR) input. Detection of voice on the VOR input inhibits the fixed transceiver for a predetermined period of time or until an end-of-transmission (EOT) data packet is received from the mobile unit. When the mobile EOT data packet is received by the phone patch interconnect unit 28, master microprocessor 66 decodes the packet and immediately keys the fixed transceiver 24 transmitter for a short time. This allows the land line user to begin talking immediately without having the first syllables of speech clipped by the attack time of the transmitter VOX circuit.

As described, the VOX circuit causes the fixed transceiver 24 transmitter to be keyed when voice energy is present on the telephone line. Unavoidable system delays in the keying of the transmitter and activation of other circuits cause the first syllables of speech to be lost even with a very fast VOX. To prevent this, voice delay line 62 may be included in the phone patch interconnect unit 28. The delay line consists of a continuously variable slope delta modulator (CVSD) encoder, a 64K dynamic RAM, and a CVSD decoder to provide up to 1.5 seconds of speech delay.

A short tone is generated by tone generator 48 at the end of the land party's speech VOX hold time, thereby alerting the mobile user that the land party has finished speaking and the phone patch interconnect unit is ready to couple his message to the telephone line. Likewise, the telephone user is given a short tone when the mobile dekeys.

By using signalling and automatic operation, as in a control point supervised phone patch, the burden of the dispatcher during phone patches can be greatly reduced. In a mobile initiated call the mobile user, via signalling packets on the radio channel, can directly dial the phone user. In a land originated call the phone user dials the telephone number of the line to which the phone patch interconnect unit 28 is attached. Provided that the auto-manual switch 80 is in the auto position, the ring signal is detected and the telephone line is seized (answered) allowing the phone user to enter DTMF digits corresponding to the address of the desired mobile unit. When the channel is clear, as determined by squelch indication or VOR activity, the data packets are sent to the selected mobile to start the telephone call. In this embodiment the phone user is limited to 30 seconds for digit entry. The phone patch interconnect unit 28 can be programmed to automatically dial a predetermined mobile or predetermined group of mobiles if DTMF digits are not entered during a specified time after the telephone is answered by the interconnect unit. Thus, even though the patch interconnect unit 28 can decode only DTMF digits from the telephone line, it can be accessed and used by telephones incapable of DTMF dialing such as rotary dial telephones.

The dispatcher monitors both directions of the patch in the control point supervised mode and can terminate the connection for any improper operation. This is accomplished by deactivating the patch enable switch 78.

A major benefit of this type of automatic operation is that the phone patch interconnect unit 28 can be located at an unattended fixed transceiver site and the dispatcher can supervise the operation of the patch interconnect unit from a location removed from the fixed transceiver site. On UHF and 800 MHz radio systems the fixed transceiver transmitter outbound frequency can be locked on transmit in a half-duplex system. The phone user can directly talk to the mobile on the outbound frequency and the mobile user can talk back on a separate inbound frequency. Since the mobile transceiver is simplex, it is not able to hear the phone user while it is transmitting thereby making the overall system half-duplex. The protocol of the system to the phone user is just like that of a regular telephone except that the phone user cannot interrupt the mobile user.

The mobile supervised patch endows the mobiles of the system with the responsibility of patch control much like that of the dispatcher for control point supervision. The phone patch interconnect unit 28 is put into the automatic mode by activation of auto-manual switch 80. When this switch 80 is in the auto position, the interconnect unit 28 is either in the control point supervised or mobile supervised mode depending upon preprogrammed instructions.

The mobile must be able to terminate a conversation at any time and may do so easily when using a half-duplex system. For simplex systems mobile termination is impossible whenever the phone user is transmitting;

therefore, in the preferred embodiment any uninterrupted transmission from the phone user is limited to a period of time such as 30 seconds after which the patch interconnect unit 28 will cause the fixed transceiver 24 transmitter to cease transmitting and monitor the channel for a brief time, in this embodiment 3 seconds, to allow for call termination signalling.

Also in the mobile supervised mode, automatic channel monitoring by the interconnect unit 28 must occur before the phone user can call the mobile user. In this way a busy channel will not be interrupted with a second call. When the channel is clear, the interconnect unit 28 calls the desired mobile unit. The called mobile unit must then transmit an enable to the patch interconnect unit 28 before the phone user can talk on the channel. The total conversation time is limited to 3 minutes in the preferred embodiment.

When the telephone line is rung and detected by slave microprocessor 68, one of the two answer protocols is followed depending upon preprogrammed information:

1. If so programmed, the patch will not answer the phone until the VOR input has been inactive for a time which can be five seconds.

2. If so programmed, the patch unit will answer immediately.

After answering the phone, the patch unit must wait for DTMF digits to be entered by the caller to select a mobile. Whether the call is to a single mobile, or a group of mobiles, data packets are used rather than audible, non-selective, ringing tones.

In this embodiment, if the channel is busy and remains busy, the VOR input to microprocessor 68 indicates busy and the telephone line is not answered for 20 rings. At the twenty-first ring the line is temporarily answered so that the line will be available for mobile initiated calls.

Figure 3:
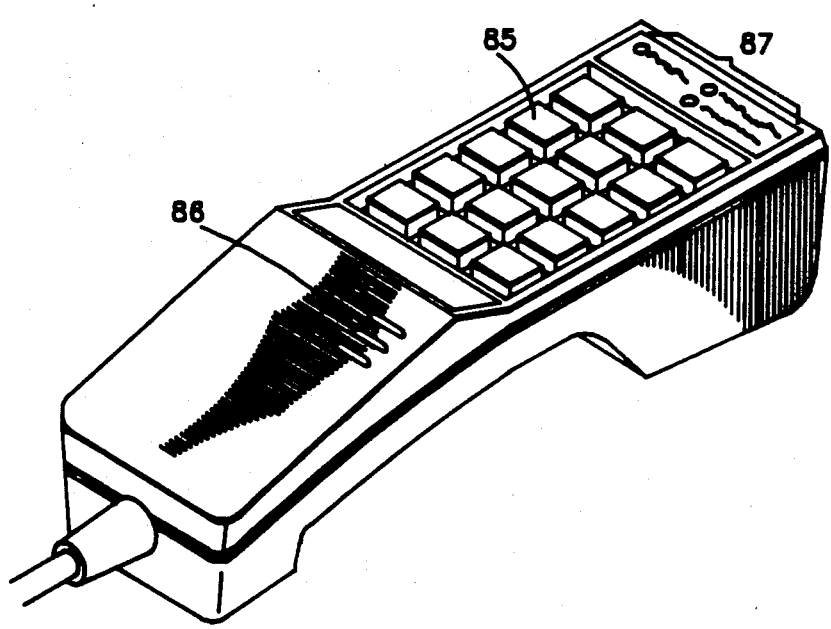
FIG. 3 is a graphic representation of a phone patch handset.

Each remote unit of this system utilizes a mobile radio transceiver well known to those skilled in the art and includes a radio telephone handset such as that shown in FIG. 3. A 3×5 keypad 85 similar to those used on conventional desk telephones but with three additional buttons—transmit, telephone, and clear—at the bottom (but not indicated) of the keypad 85, is located on the handset. This keypad 85 consists of printed circuit board contacts and an elastomeric key membrane with carbon impregnated buttons which connect the circuit board contacts where the key is depressed. Also visible from the prospective of FIG. 3 is a slotted opening 86 coupling the output of an alerting transducer to the surrounding air. Additionally, LED indicators 87 at the top of the handset provide status of operation (telephone, busy, and no acknowledge) to the user.

Figure 4:
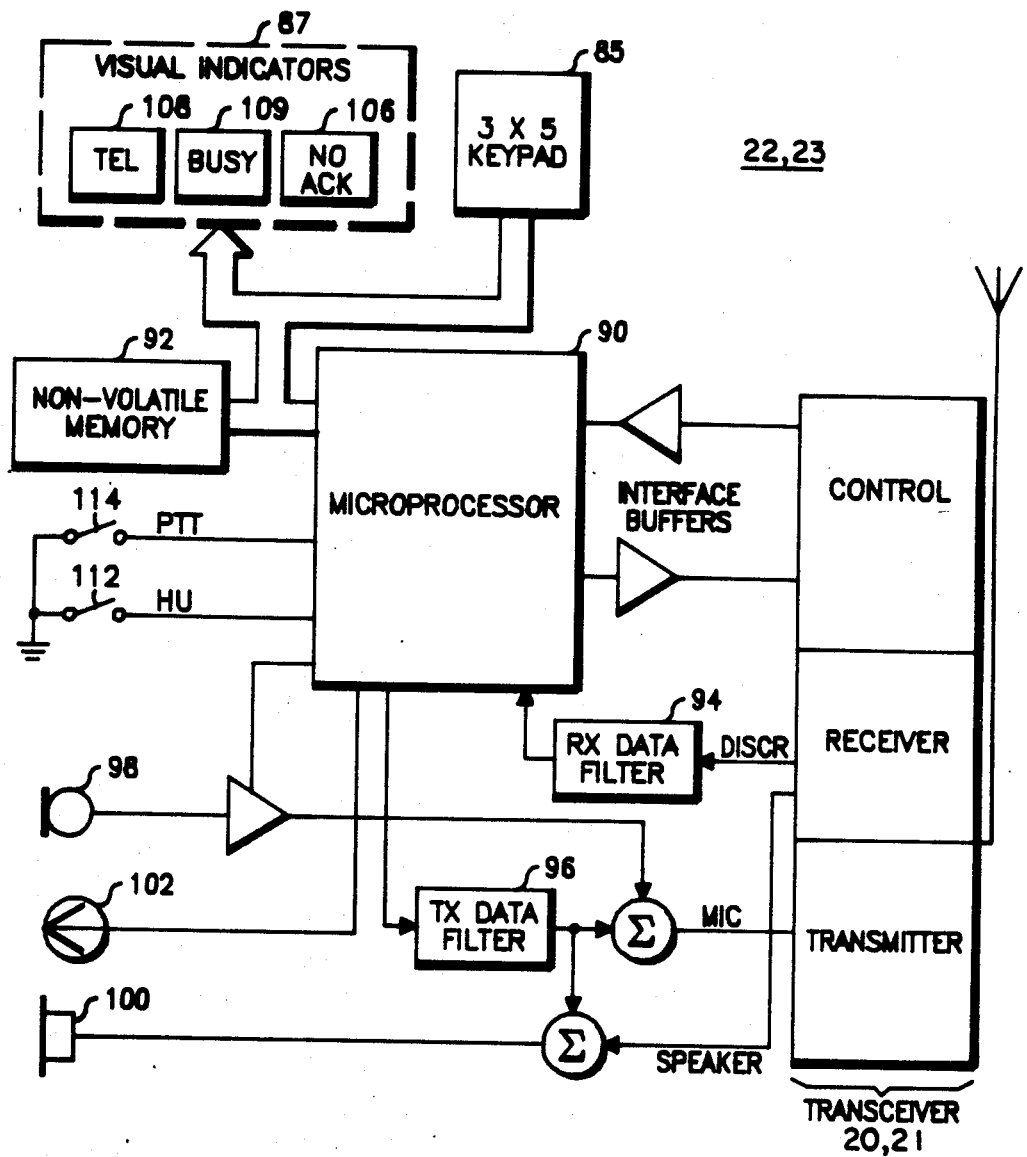
FIG. 4 is a block diagram of the phone patch handset and includes the connections to a mobile transceiver.

Referring to the block diagram of the phone patch handset 22, 23 of FIG. 4, it can be seen that the unit consists of a microprocessor 90 (which may be an MC146805 by Motorola, Inc.), a non volatile EEPROM code plug memory 92, a received data filter 94 and a transmit data filter 96 realized by conventional techniques, a microphone 98, an earpiece receiver 100, a tone transducer 102, the 3×5 keypad 85, and the LED visual indicators 87. The phone patch handset 22, 23 is connected to the mobile transceiver 20, 21 by a detachable multiconductor cord (not shown), typically a coil cord similar to that found on common telephone instruments.

The non-volatile memory 92 contains all of the necessary identification codes and instructions for the microprocessor 90 to decode the packet data as well as any user defined codes, options selections, telephone numbers, and system parameters. The non-volatile memory 92 is programmed "in-circuit" by directly connecting the phone patch handset 22, 23 to the phone patch interconnect unit 28 via the multiconductor coil cord. The transmit and receive data packet signalling system used for the radio channel is also used as the data transfer media between the mobile handset and the interconnect unit. Therefore, no special hardware module is required for programming. The handset key pad 85 is used to enter key sequences to program either the handset or the interconnect unit. As the program values are entered from the keypad 85, they are displayed on the interconnect unit display 72. If no values are entered, then a set of default values are used.

To originate a telephone call from the phone patch handset 22, 23, the user presses the "telephone" key on the keypad 85 and then enters the digits of the desired telephone number. The digits are stored in the microprocessor 90 which performs all keypad scanning, debounce functions, and data packet decoding/encoding. The telephone number may be any standard number from 1 to 14 digits. The handset user will receive audio feedback in the form of single tones as each digit is entered if the handset is enabled to do so. The digit values are not transmitted with each key entry as in DTMF systems but are stored and forwarded to the phone patch interconnect unit 28 only when the entire telephone number entry is complete and the user presses the "transmit" key. The telephone number is then transmitted by a series of either two or three data packets generated by the microprocessor 90 and passed through the transmit data filter 96 to the mobile transceiver transmitter. If an entry error is made by the radio user, the "clear" key of key pad 85 may be used to abort the call.

If a valid telephone number is transmitted (the phone patch interconnect unit 28 may exclude long distance calls if it is preprogrammed to do so), the interface unit will transmit a data packet acknowledge back to the calling mobile unit. This data packet is passed from the receiver of the mobile transceiver to the receiver data filter 94 and to the microprocessor 90. The radio user will then hear a short audio tone from transducer 102 to indicate that the interconnect unit has been activated. If no acknowledge is received, the remote unit will automatically retransmit the data packets. The "no ack" indicator 106 of the handset indicators 87 will flash and the "tel" indicator 108 will go out if no acknowledge packet is received. (The "tel" indicator 108 illuminates whenever a telephone call is requested or received. The busy indicator 109 lights when a call is attempted and the radio channel is busy).

When the phone patch interconnect unit 28 receives the valid telephone number, it converts the digits in the data packet to DTMF and places the call on the telephone line. The audio activity on the telephone line is transmitted back to the mobile user, who hears the ringing or busy tones or the voice of the called party. A call termination may be initiated at any time by the mobile user who either presses the "clear" button of keypad 85 or merely hangs up the phone patch handset. The hang up mechanism contains a magnet which activates a Hall effect hang-up (HU) switch 112 in the handset. Either action will cause the termination of the telephone call, but only when the simplex mobile transceiver can transmit. The phone patch handset 22, 23 will automatically monitor the radio channel via the mobile transceiver receiver and cause a disconnect data packet to be transmitted when the channel is clear. The "tel" indicator 108 will be illuminated during the telephone call but once connect has been established the state of the "tel" indicator 108 is controlled by the phone patch interconnect unit 28 which extinguishes the indicator 108 with a data packet acknowledging the disconnect request. Only the disconnect command from the served remote unit will cause a call termination. This prevents another remote unit from accidently or maliciously disconnecting a call.

After the interconnect unit 28 has been accessed and the telephone call established, the mobile user's transmissions control the interconnect unit 28. Whenever the remote unit user wishes to transmit, the push-to-talk (PTT) button 114 is pressed to key the transmitter. Every such remote unit transmission contains a BOT (beginning-of-transmission) and an EOT (end-of-transmission) data packet that is used by the interconnect unit 28 to initially enable the call and, once the call is in process, to control the transmitter keying in the case of the simplex fixed transceiver.

The phone patch handset also provides automatic telephone number dialing capability. Ten telephone numbers of from 1-14 digits may be predefined as one of the numeric keys (0-9) of the keypad 85. The digits associated with a particular telephone number are stored in the handset non-volatile memory 92 for recall as one of the mobile handset numeric keys. To activate the automatic dialing of prestored numbers, the mobile user simply presses the appropriate digit key and then the "transmit" key to cause the phone patch handset to recall from storage the full telephone number corresponding to the single pressed digit. The telephone packets are then sent as though the complete number had been entered on the keypad 85. The phone patch handset also has the capability of storing the last entered telephone number and the user may "redial" the last entered number by simply pressing the "tel" button and then the "transmit" button.

Each phone patch interconnect unit 28 which shares a fixed transceiver may be assigned a permanent one digit access code. In this case, the mobile user will use the same telephone number dialing sequence described above, but now the telephone number will include the patch interconnect unit 28 access code as a prefix, i.e., instead of dialing "tel, 5551212, transmit" the entry becomes "tel, 65551212, transmit". In addition to the access code selectivity, the phone patch interconnect unit may be programmed to respond only to phone patch handset identifications within certain bounds so that only particular remote units may use the interconnect unit.

Figure 5:
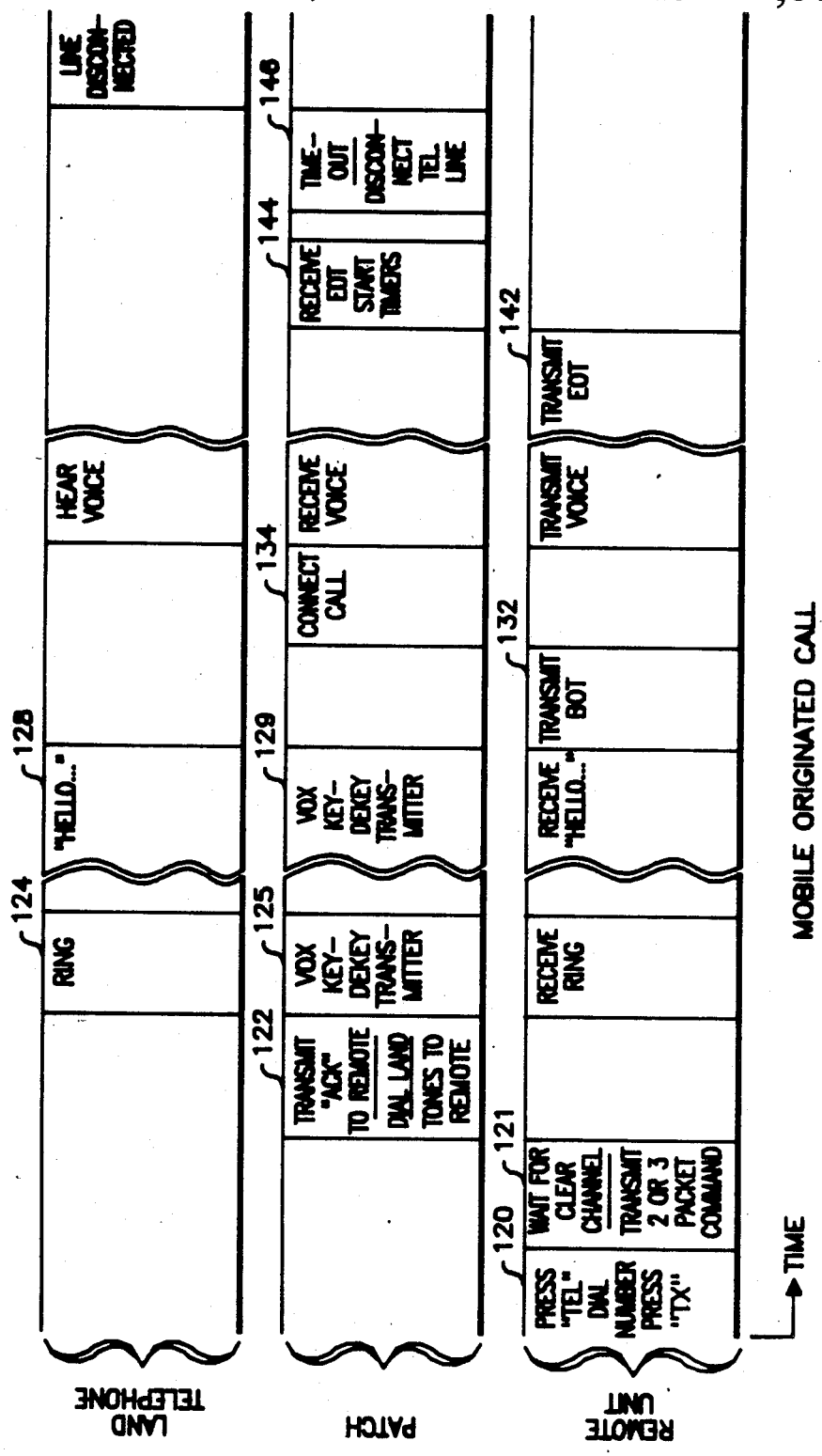
FIG. 5 is a relative timing diagram of a mobile originated telephone call.

The calling process of a mobile-to-land call is shown in the timing diagram of FIG. 5. The mobile user presses the "telephone" key of keypad 85, then the telephone number to be called, and finally "transmit" as shown in 120. The handset microprocessor 90 waits until the channel is clear and transmits a 2- or 3-packet command 121, to the patch interface unit 28. The interface unit transmits an "ACK" packet, dials the land telephone number, and returns the tones to the mobile, as indicated at 122. The telephone ringing tones, 124, trigger the interconnect unit VOX and cause the tones to be transmitted, at 125, to the mobile unit. Assuming that the called party answers, at 128, the voice energy triggers the VOX and transmits the voice, at 129, to the mobile unit. When the land party ceases speaking, the VOX, after a short period of time, dekeys the transmitter thereby allowing the mobile transmitter to be keyed. The activation of the phone patch handset PTT button 144 causes the handset to transmit a beginning-of-transmit (BOT) command, indicated at 132, which enables the interconnect unit to connect the audio from the mobile to the telephone line, at 134. At the conclusion of the conversation when the mobile user releases the PTT button 114, the handset causes the transmission of an end-of-transmission (EOT) command at 142. The interconnect unit receives the EOT, indicated at 144, and times the duration of inactivity. If the timer reaches a predetermined value, the telephone connection is dropped without a disconnect from the remote unit and the call is terminated at 146.

In the case of a land originated telephone call, there are two modes available in any given system: autodial and direct unit/fleet/group call. Direct call allows the land line user to selectively call any remote unit/fleet group with a phone patch handset 22, 23 and establish a telephone conversation via the radio link. The autodial allows the land line user to call a specific preprogrammed unit, group, or fleet whenever the patch interconnect unit does not receive DTMF digits within a predetermined time.

Figure 6:
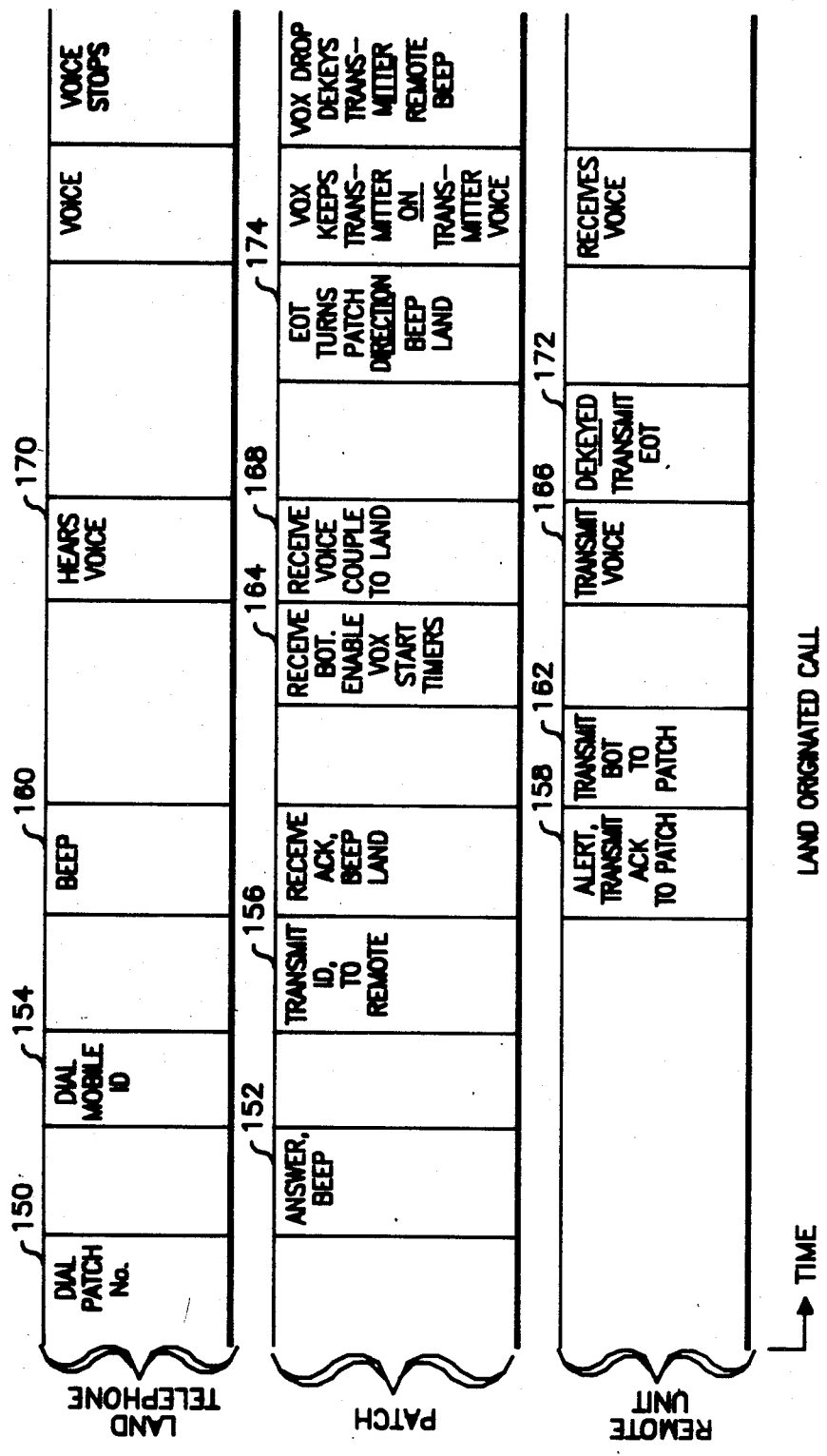
FIG. 6 is a relative timing diagram of a land originated telephone call.

The calling process in a land originated call sequence is diagrammed in FIG. 6 and occurs as follows. The land line user dials the phone patch interconnect unit indicated at 150. If the interconnect unit is not busy it will answer the call, if so programmed, and provide a beep to the land line caller, shown at 152. The land line user may then enter the identification code of the phone patch handset, at 154, thereby causing the interconnect unit to transmit the identification to the remote unit, at 156, when the radio channel becomes clear. If the call is successful and the interconnect receives and acknowledge from the mobile handset, the "tel" indicator flashes and a series of acoustic alerts is generated, at 158. The calling land line party hears short audio tones, indicated at 160, informing the caller that the remote has been paged. The "tel" indicator will continue flashing until the mobile user transmits, the "clear" key is pressed on the phone patch handset, or the interconnect unit disconnects after a time-out. If the mobile user is available and transmits back to the caller, the first command which the phone patch handset transmits is a BOT to the interconnect unit 162. At this time the "tel" indicator stops flashing and remains on continuously until disconnect. The phone patch interconnect unit receives the BOT, enables the VOX, and starts the call timers, indicated at 164. Messages transmitted by the mobile user, at 166, are received by the fixed transceiver and coupled to the telephone line by the phone patch interconnect unit, as indicated at 68. The land line user is then able to hear the message, at 170. When the mobile user completes his message he releases the PTT switch 114 which causes the phone patch hand set to transmit an EOT, at 172, to the interconnect unit. This EOT causes the patch to change the direction of the conversation and, if the radio system is simplex, key the fixed transceiver transmitter and beep the land line user, at 174, so that the land line user knows that it is his turn to talk. From this point on the mobile user controls the interconnect unit and operations identically to the mobile originated call mode described above.

In the autodial mode the phone user is not required to enter an identification code. This method makes possible automatic calling when the land/line user does not have a DTMF telephone. The remote unit or units called in this mode will respond in the same fashion as in the individual call described previously. However, if group or fleet calling is performed, the BOT and EOT data packets that are sent with every mobile voice transmission will contain the group or tleet identification codes. This feature allows multiple remote units to respond to the land/line caller and the conversation is heard by the entire group or fleet.

The phone patch handset further provides "call forwarding" allowing calls for one mobile user to be transferred from that user's mobile identification number to another mobile identification number. The call forward command is generated at the originating phone patch handset, but the call forwarding action takes place at the interconnect unit. The originating mobile user keys into the handset "telephone, #1, NNNN, transmit". This causes the interconnect unit to redirect the telephone calls for the transferring remote unit to remote unit identification "NNNN". Either the "from" phone patch handset or the "to" phone patch handset may cancel the call forward by keying "telephone, #3, transmit". In a similar manner. call pickup may be done entering "telephone, #2, NNNN, transmit". The mobile user may then receive any calls which would have gone to mobile NNNN.

The signalling system used in the preferred embodiment of the phone patch system is one which uses PSK modulation and demodulation at 600 BPS with a 1500 Hz carrier. Other burst signalling methods such as the 5-tone system common in Europe (CCIR or ZVEI standards), may be used by the system designer as desired without departing from the scope of this invention.

Data is coherently detected in this embodiment through software techniques and data transfer is accomplished in bursts or packets that are synchronized through a 40-bit, dual-phase optimized code word. A rate ½ convolutional threshold decoder is used for error correction and a 16-bit inverted CCITT redundancy code is used (as an "inner" code word) for message error detection. Fading protection is achieved through time diversity of the 112-bit encoded data.

A random input contention protocol is used in channel data entry. This type of system is intended to interface into existing voice traffic systems where voice has priority over data functions. Handshake and retransmission are used to provide reliable and automatic operation of the basic functions over a radio channel. Acknowledgement of commands is standard.

Due to the complexity and serial arrangements of the RF system which add time delay to the signal, it is often necessary to delay packet transmissions by a variable amount depending upon the particular radio system configuration. This delay ensures the proper reception and decoding of the data at the receiving end. System delay is programmable in both the phone patch handset and the phone patch interconnect unit of the system. and may range from 0 to 1.5 seconds in steps of 100 milliseconds per step in the preferred embodiment. Normally the delay is the same for all mobile units and is determined by the phone patch interface unit. The delay for phone patch handsets is automatically "downloaded" from the interconnect unit during handset programming. The system delay is in the form of silent carrier thereby minimizing the amount of data heard on the voice channel.

Figure 7:
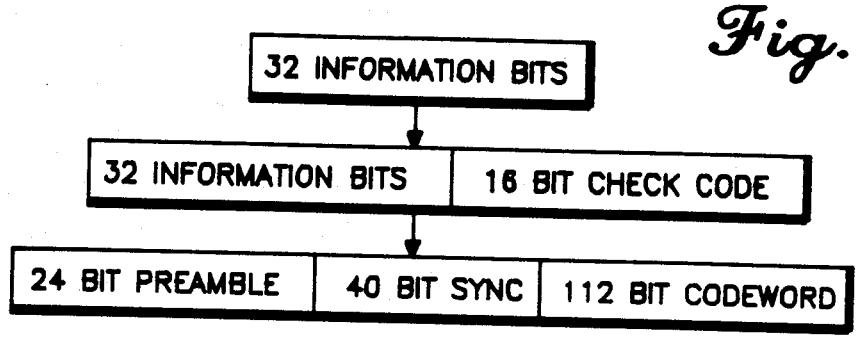
FIG. 7 illustrates the composition of the data packet.

The data packet transmitted on the radio channel is diagrammed in FIG. 7 and consists of a 32-bit data word combined with a 16-bit inverted CCITT redundancy check code embedded in a 112-bit convolutional code word. A 40-bit dual-phase optimized code word used for message synchronization preceeds the 112 bit word which is preceeded by a 24-bit preamble code used for carrier and bit synchronization. A similar signalling technique is disclosed in U.S. patent application No. 402,689 filed in behalf of Burke et al. (General Purpose Data Control System) filed on July 28, 1982; in U.S. patent application No. 402,690 filed in behalf of Burke et al. (Selective Call, Paging, and Priority Signalling System) on July 28, 1982; and in U.S. patent application No. 402,682 filed in behalf of Burke et al. (Data Signalling System) on July 28, 1982, all of which are assigned to the assignee of the present application.

Figure 8:
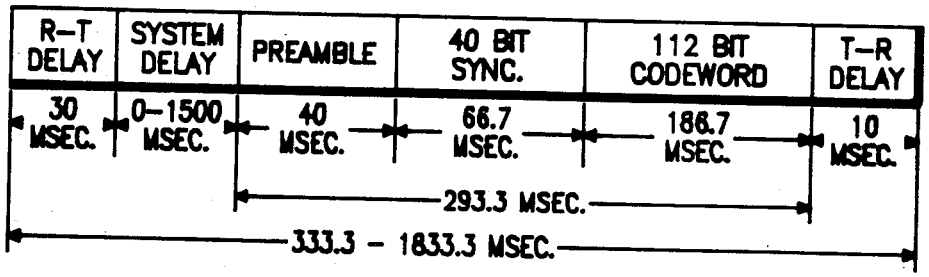
FIG. 8 illustrates the timing of the data packet.

The packet transmission timing consists of all of the required message elements, system delay, and radio keying times as shown in FIG. 8. The information words and acknowledgements in the system utilize automatic retransmissions if the proper response packet is not received within a certain period of time. The sending unit will wait a random and discrete interval before the next retransmission. This delay is computed after the first transmission and recomputed for every subsequent transmission according to the formula:

Packet Delay $=(2+N)\cdot PT$ where
$N = 0, 1, 2,$ or 3 (uniformly distributed)
PT = system packet time During the packet delay time, the sending unit monitors the channel for the response packet for a minimum of two packet times. This discrete and random packet delay staggers the transmissions of multiple units and eases contention problems.

Figure 9:
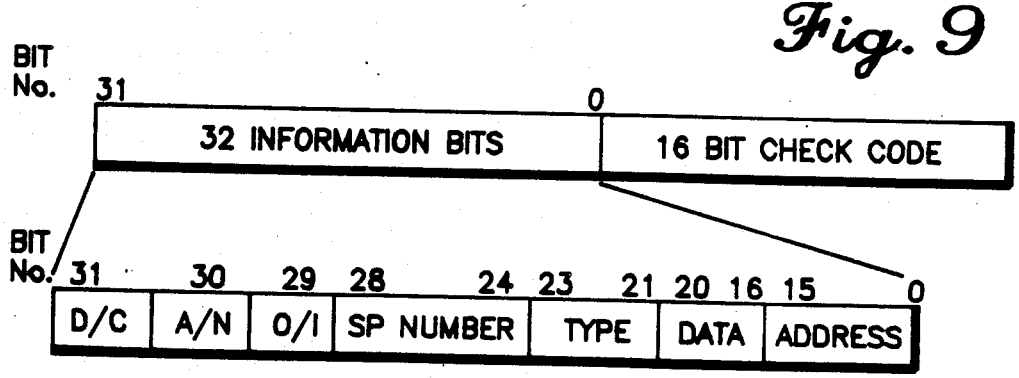
FIG. 9 illustrates the composition of the 32-bit information word.

If a proper response packet is not received after the initial transmission, the sending unit will automatically retransmit the data packet and will continue to do so up to 4 retransmissions. The data packet transmission sequence terminates immediately after decoding a response packet or after a total of five transmissions. The information word transmitted in the data packet utilizes the format shown in FIG. 9 where the rightmost 16 bits of the information word comprise the unit address and the remainder of the message comprise bits 16 to 31 as shown. A two packet telephone call utilizes two bit packets concatenated with a 25 millisecond separation delay. The first packet is a header packet and contains information word: ·
B"0 1 0 11100 001 00000": ADDRESS, where ADDRESS is the 16 bit unit identification The data packet which follows contains up to 7 BCD digits corresponding to the dial telephone number:
B"1000": H"FFF 1234"

This information word would be read as telephone number 1234. A non BCD digit of hex "F" is understood to be a leading or a trailing delimiter of the desired telephone number. Another valid information word for this telephone number could be:
B"1000": H"1234 FFF"
or for a full 7 digit number the word would be:
B"1000": H"1234567"

For those telephone unumbers employing more than 7 digits (such as 1 2 3 4 5 6 7 8 9 0 1 2 3 4), a 3 packet data transmission is available. The 3 packet header format is:

B"0 1 0 11100 010 0000": ADDRESS, where ADDRESS is the 16 bit unit identification and the second packet would contain:

B"100": H"1234567"

and the third packet word would be:

B"1000": H"8901234"

The first data packet may have a leading character or characters hex "F", but cannot have trailing delimiters of hex "F" if actual BCD digits are contained in the third packet. In other words the two data packets considered together may not have hex "F" between valid BCD digits of the telephone number.

At the beginning of each simplex transmission of the remote unit is a BOT data packet. It instructs the phone patch interface unit to turn around the patch to the mobile to land direction. No acknowledge is ever expected. The data is transmitted in the format shown in FIG. 9:

B"0 0 0 11100 000 00011": ADDRESS at the end of each simplex transmission by the remote unit is an EOT data packet. It tells the interconnect unit to turn around the patch to the land to mobile direction and again no data response is expected. The information word is:

B"0 0 0 11100 00 00000": ADDRESS

To terminate a telephone call in progress, a request disconnect message is transmitted by the remote unit to the phone patch interconnect unit and the interconnect unit responds with a standard format "ACK", if an individual remote unit is involved with the call. The request disconnect data packet contains:

B"0 1 0 11100 000 00010": ADDRESS

The phone patch interconnect unit initiates two commands. The first is addressed to an individual phone patch handset unit or a group or fleet of handset units. The second is a disconnect instruction. The telephone call command is a single packet having, if an "ACK" is required, the data:

B"0 1 1 11100 000 0001": ADDRESS

If an "ACK" is not required, the information word is:

B"0 0 1 11100 000 0001": ADDRESS

The phone patch interconnect disconnect information word is:

B"0 1 1 11100 000 0100": destination ID.

If an "ACK" is needed. If not:

B"0 0 1 11100 000 0100": destination ID.

Figure 10:
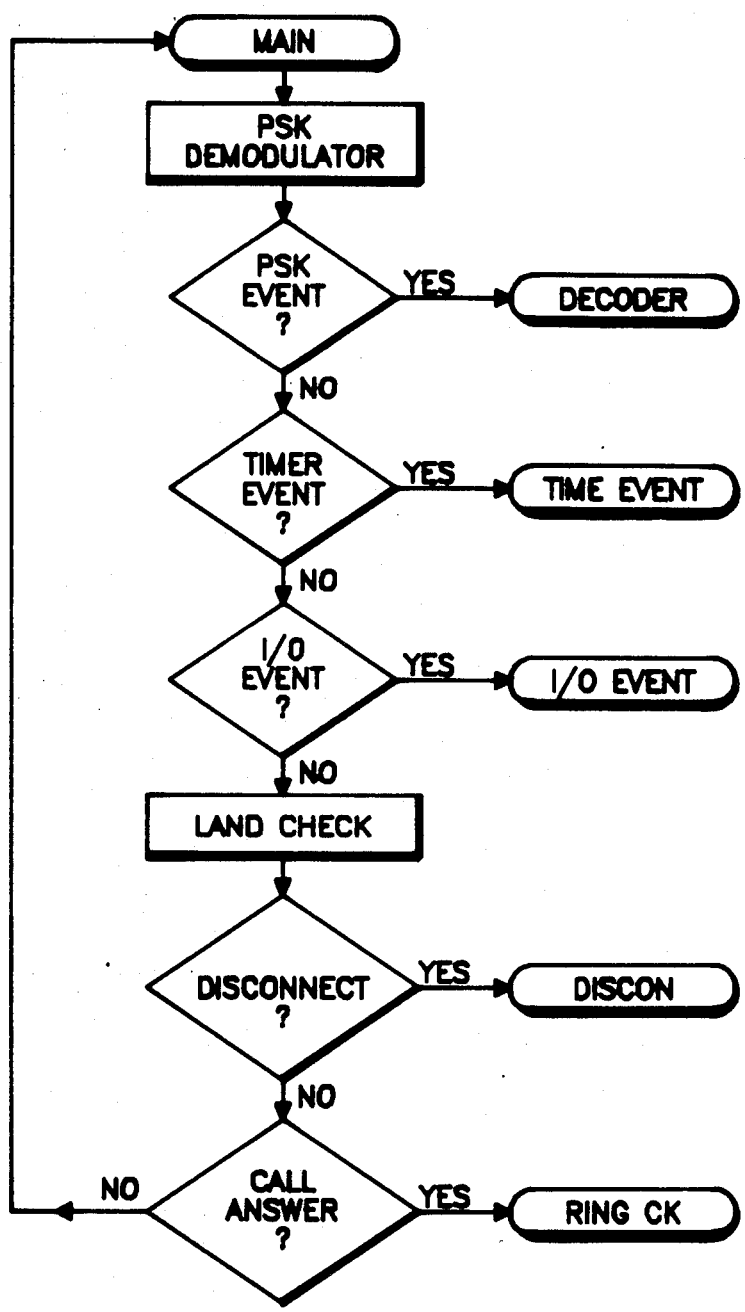
FIG. 10 is the basic process flowchart for the phone patch interconnect patch unit.
Figure 11A:
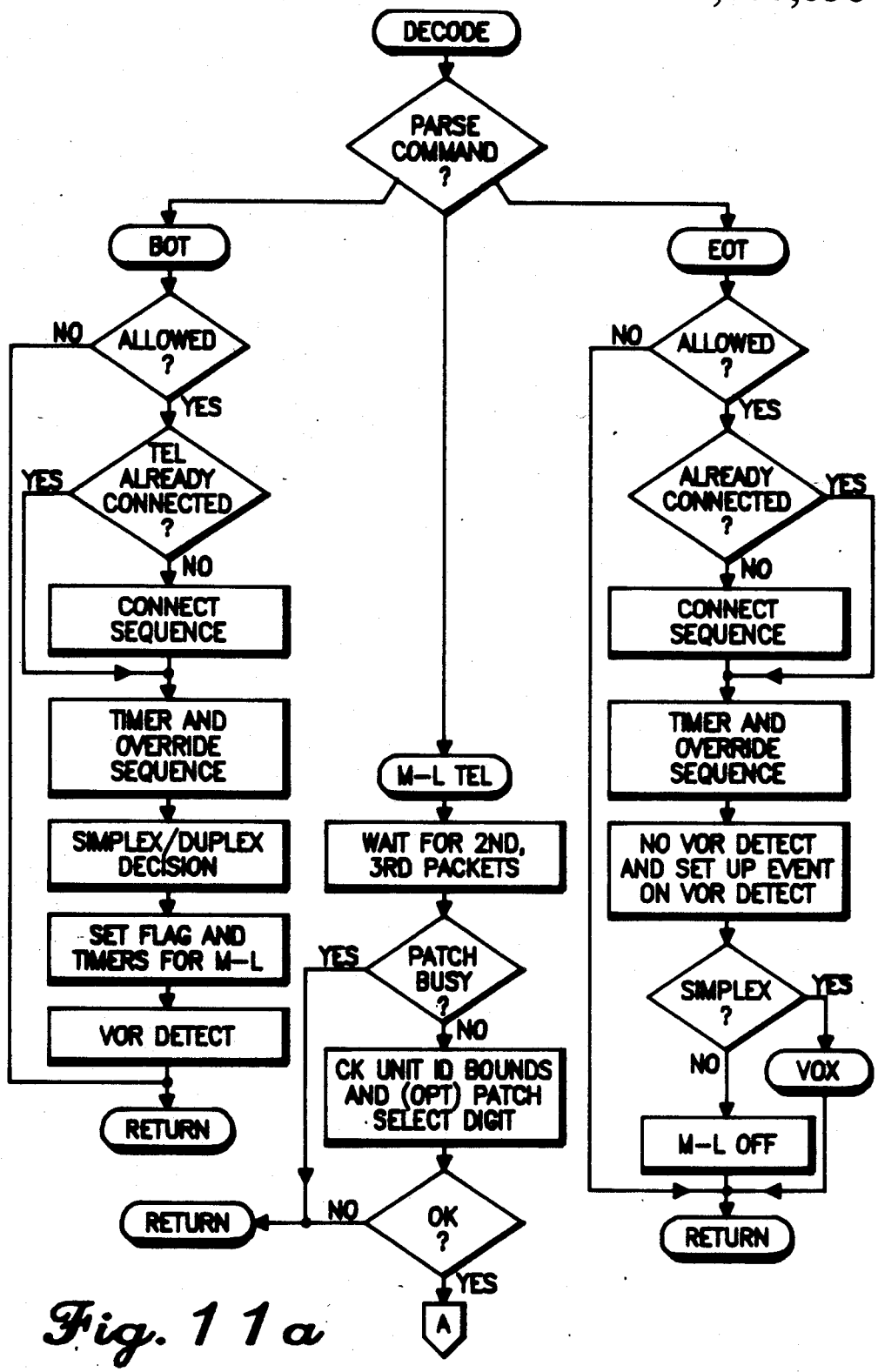
Figure 11B:
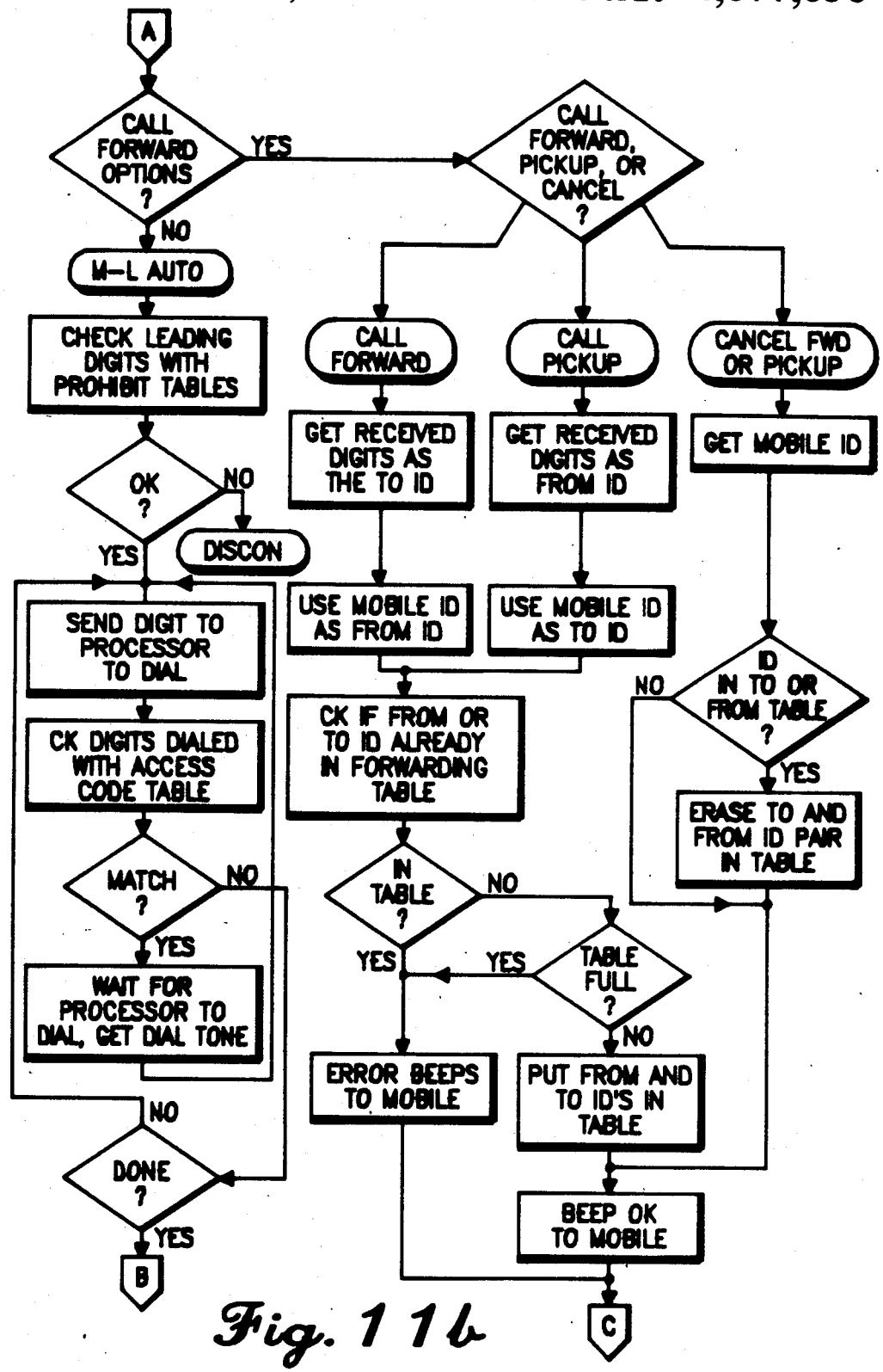
Figure 13:
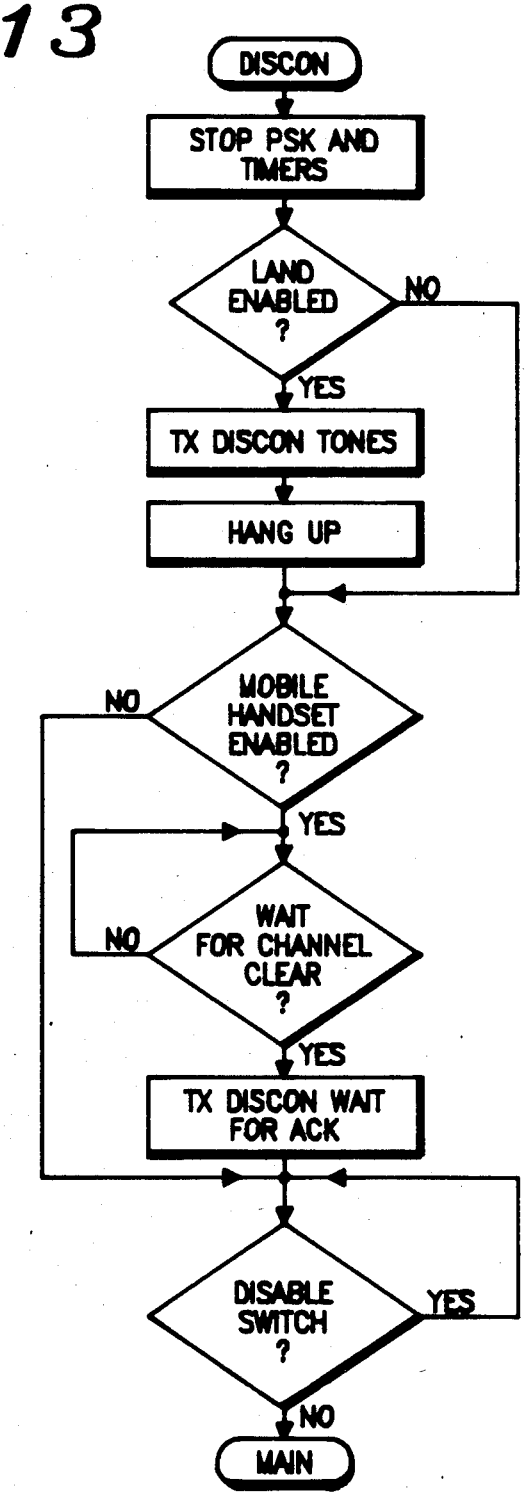
FIG. 13 is a flowchart of the Disconnect subroutine of FIG. 10.
Figure 14A:
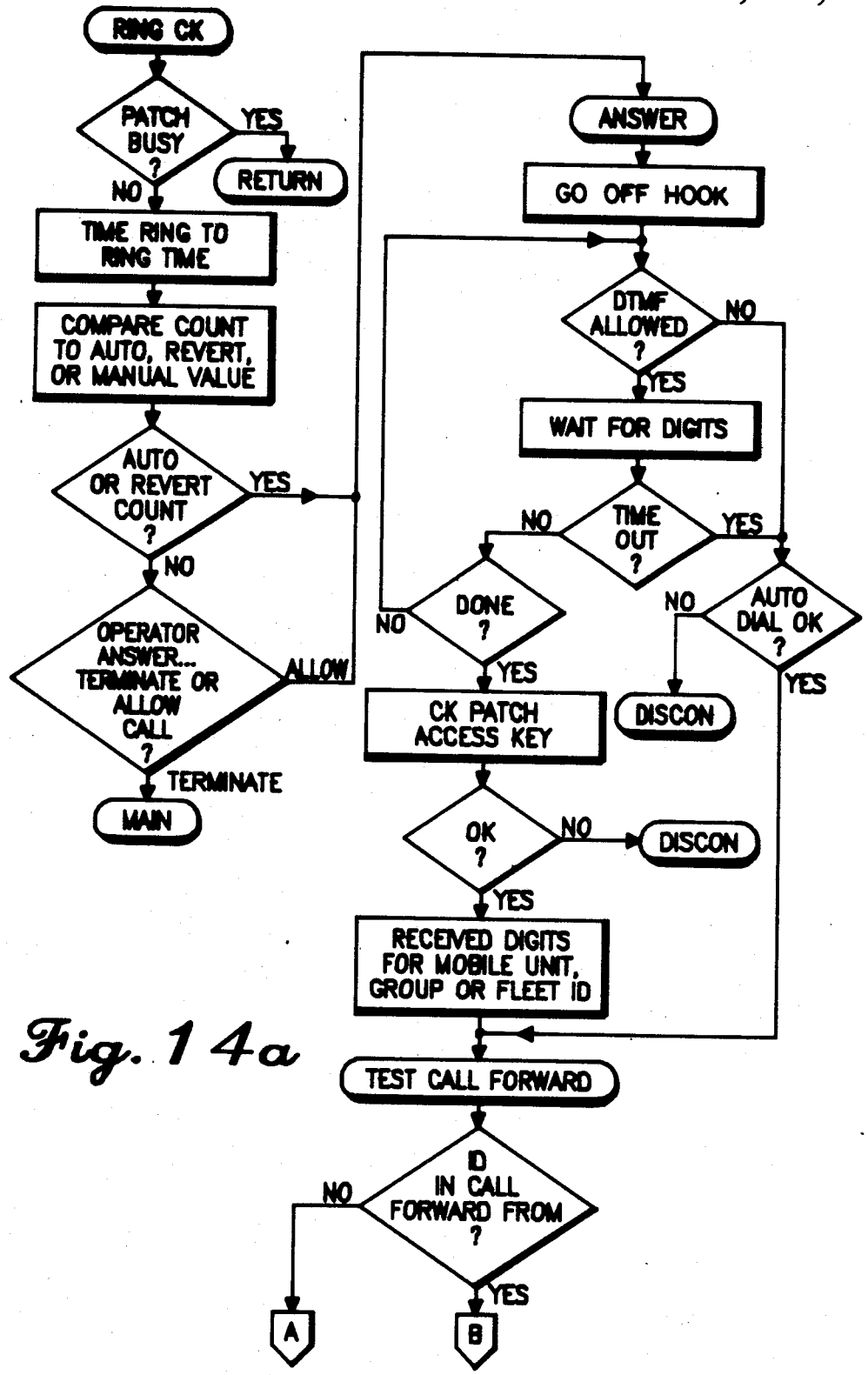
FIGS. 14a and 14b are a flowchart of the Ring Check subroutine of FIG. 10.
Figure 14B:
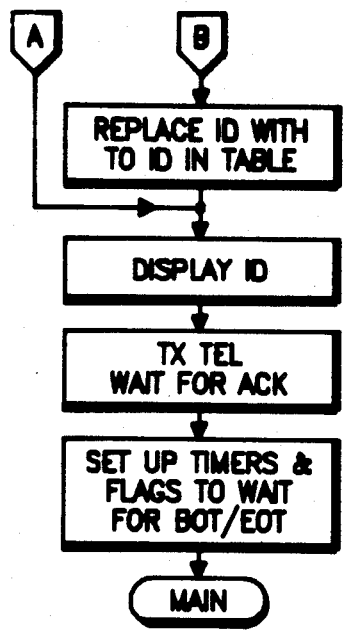

The steps taken by the phone patch interconnect unit are shown in the basic flowchart of FIG. 10. The received data decode subroutine of the phone patch interconnect unit is shown in FIGS. 11a, 11b, and 11c. Timer Event subroutine and I/O Event Subroutine are shown in FIG. 12, Disconnect Subroutine is shown in FIG. 13, and Ring Check Subroutine is shown in FIGS. 14a and 14b.

Figure 15:
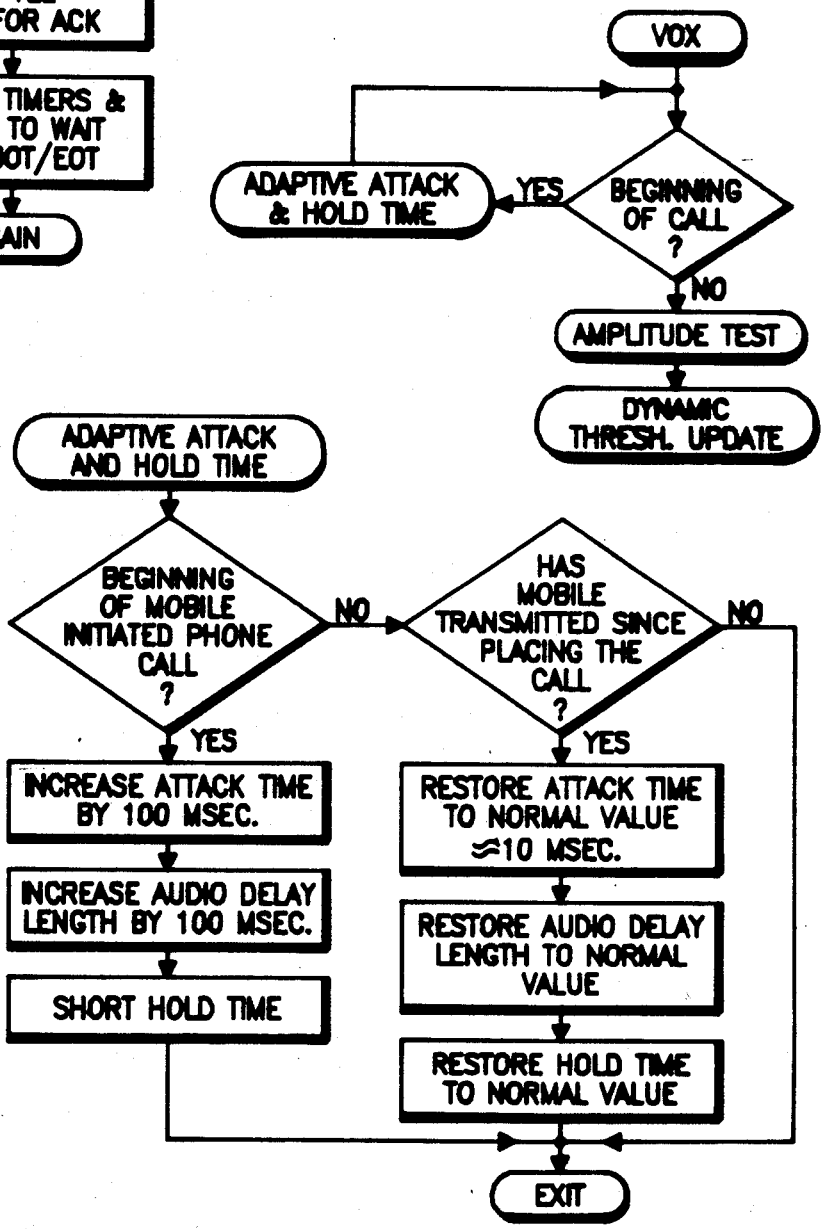
FIG. 15 is a flowchart of the VOX routine of the phone patch interconect unit.
Figure 16:
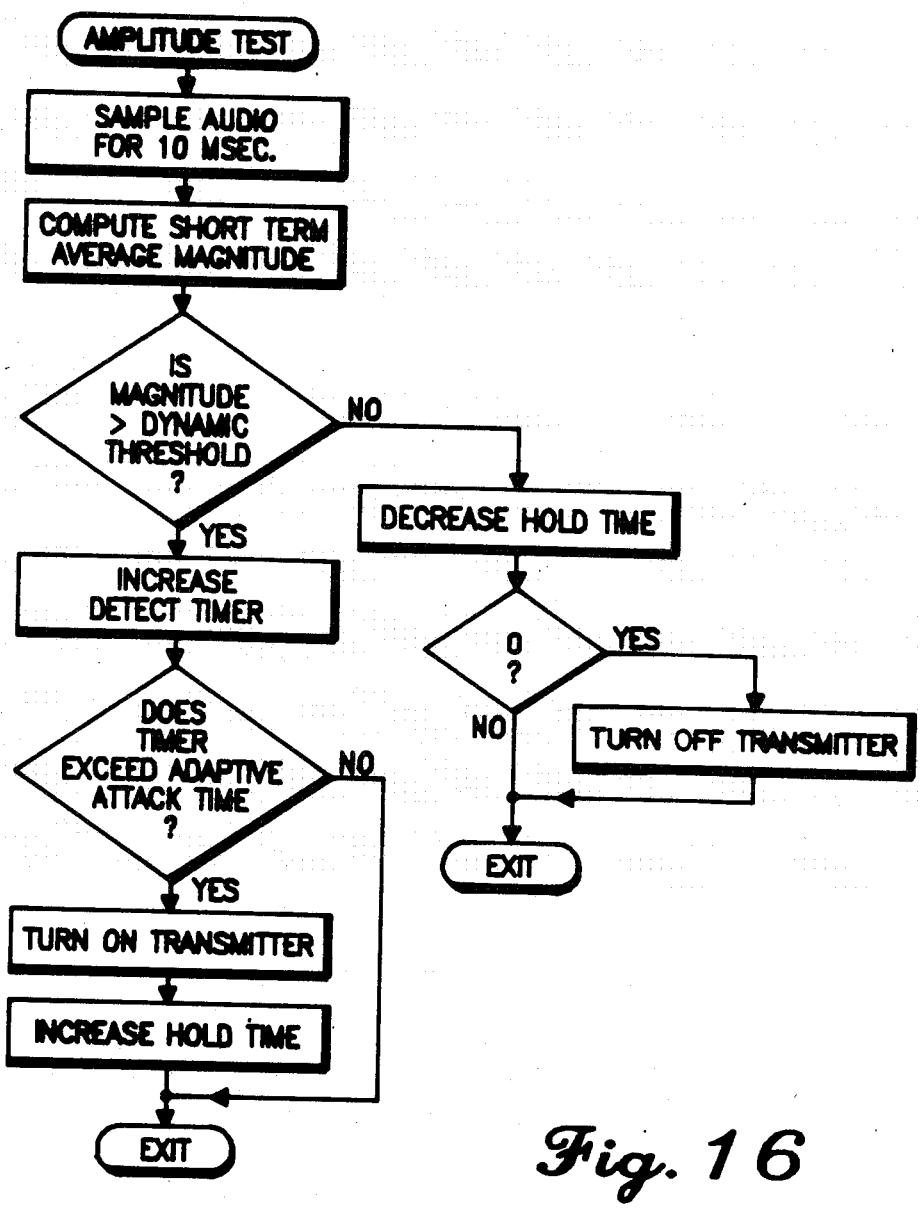
FIG. 16 is a flowchart of the Amplitude Test subroutine of FIG. 15.
Figure 17:
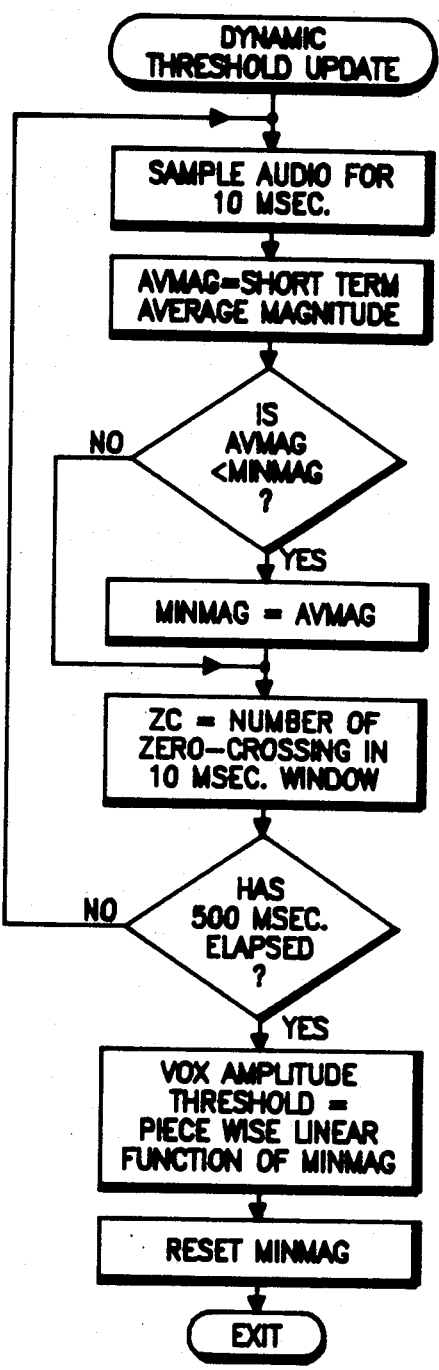
FIG. 17 is a flowchart of the Dynamic Threshold Update subroutine of FIG. 15.

The VOX algorithm for the phone patch interconnect unit is shown in the flowcharts of FIGS. 15, 16, and 17. The busy tones which may be input to the phone patch interconnect unit from the telephone line are shown in FIG. 18. As described hereinbefore zero crossings of the tone signal are detected during the tone duration. The process employed in busy tone detection is shown in FIG. 19.

Figure 20:
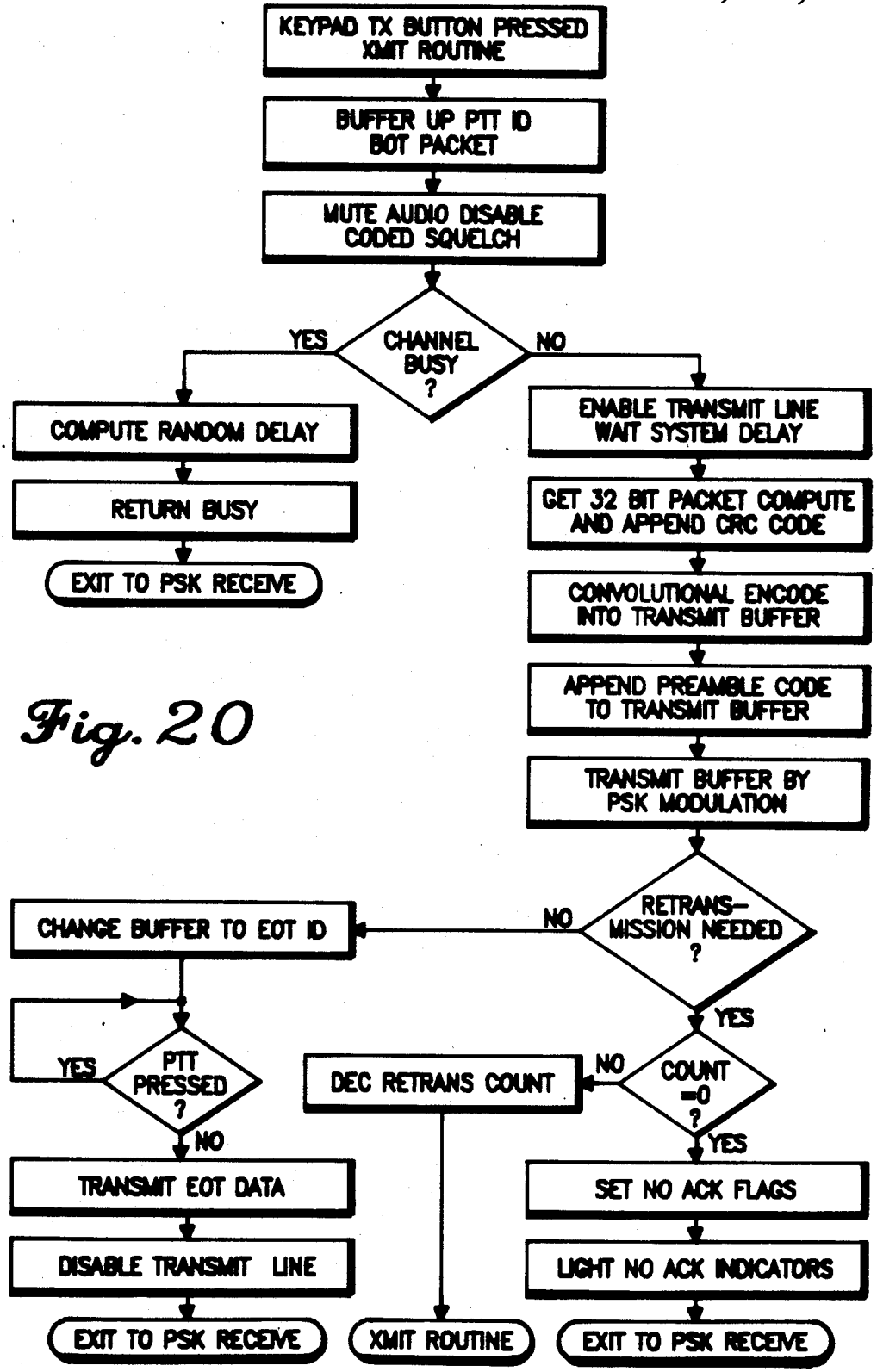
FIG. 20 is a flowchart of the Transmit process of the phone patch handset.
Figure 21A:
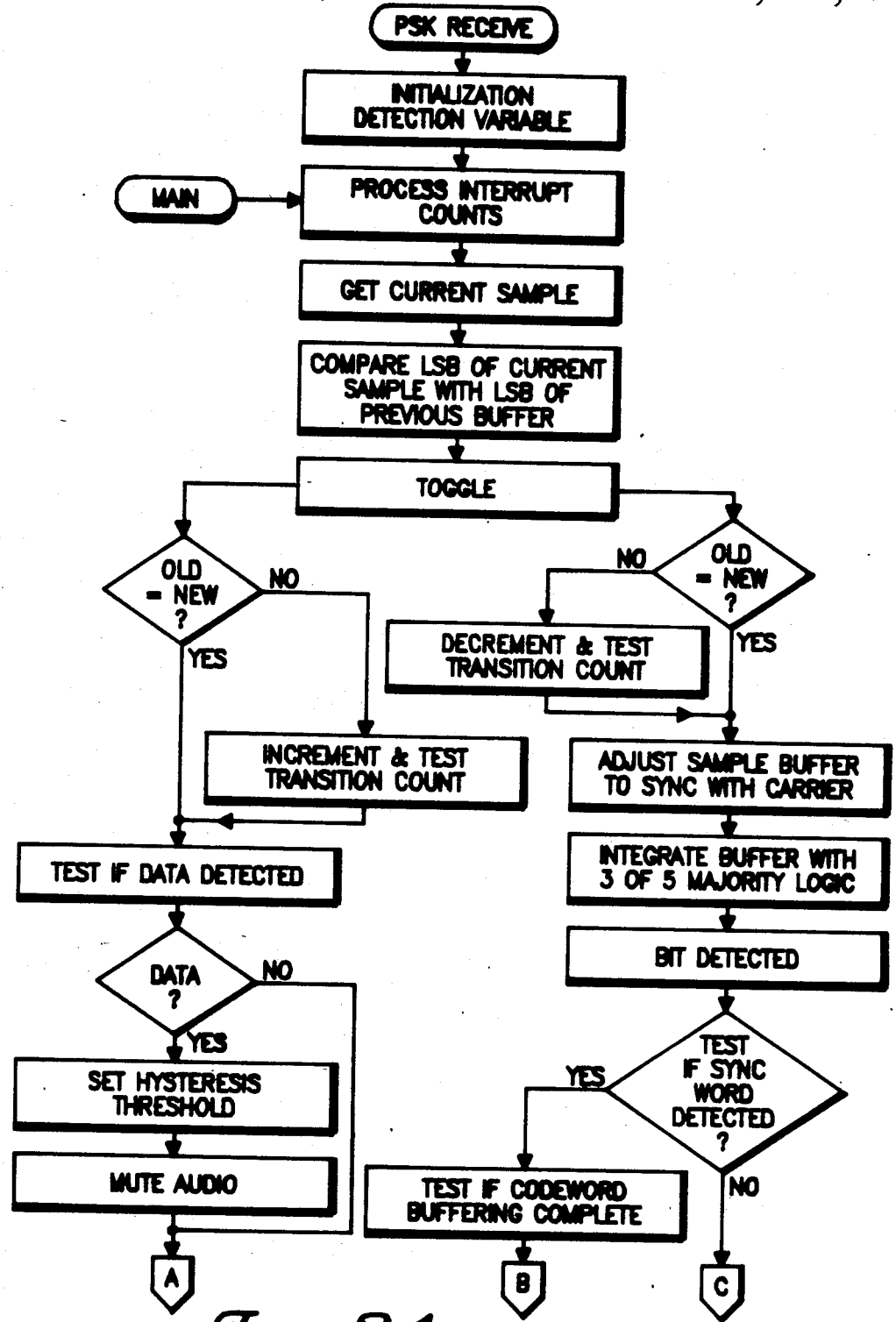
FIGS. 21a and 21b are a flowchart of the PSK Receive process of the phone patch handset.
Figure 21B:
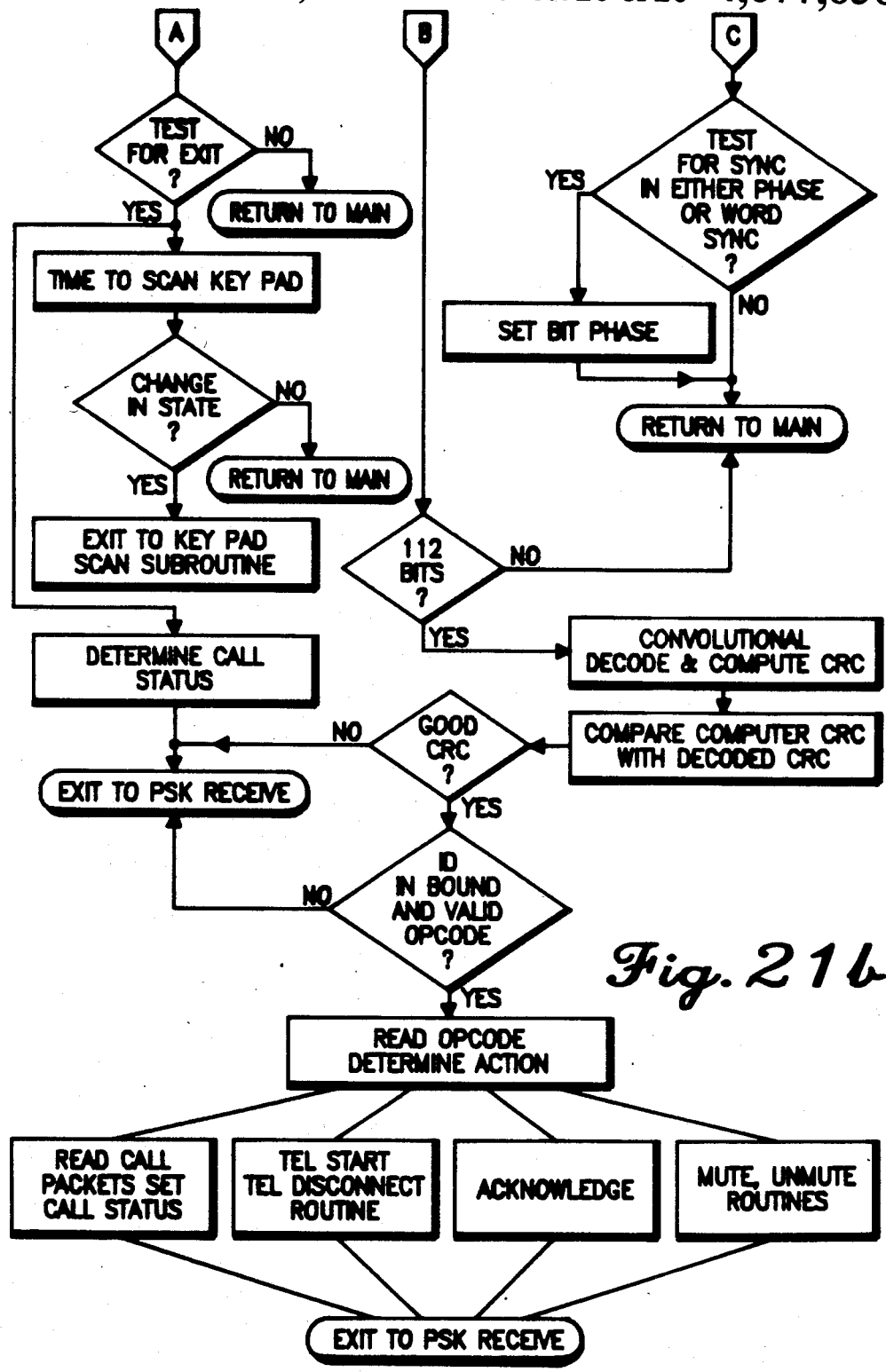

A flowchart of the remote unit handset transmission process is shown in FIG. 20. The receive process of the remote unit handset is shown in FIGS. 21a and 21b.

While a particular embodiment of the equipment and system according to the invention has been shown and described, it should be understood that the invention is not limited thereto since many modifications may be made. It is therefore contemplated to cover by the present application any and all such modifications that fall within the true spirit and scope of the basic underlying principles disclosed and claimed herein.

We claim:

1. An interconnect system employed in a two-way communications system operating on a radio channel and providing access to a telephone line comprising:
   a telephone patch interconnect unit connected to a fixed radio transceiver and comprising:
   means for accepting dialed digits from the telephone line and encoding said dialed digits into a first data packet;
   means for monitoring the activity on the radio channel received by said fixed transceiver and coupling said first data packet to said transceiver for transmission when no activity is present on the radio channel;
   means for accepting and acknowledging a second data packet received by said fixed radio transceiver and decoding said second data packets into digits suitable for coupling to the telephone line thereby dialing a telephone number; and
   means for coupling audio received from said fixed radio transceiver to the telephone line and for coupling audio from the telephone line to said transceiver, and
   at least one remote unit having a unique identification digit sequence comprising:
   means for receiving and decoding said first data packet into digits and activating an alert if said decoded digits match said unique digit sequence identification;
   means for generating and storing digits corresponding to a desired telephone number; and
   means for encoding said telephone number digits into said second data packet and transmitting said second data packet to said fixed radio tranceiver of said telephone patch interface unit.

2. An interconnect system in accordance with claim 1, wherein said remote unit further comprises means for repeating the transmission of said second data packet a predetermined number of times if an acknowledgement code is not received from said telephone patch interface unit.

3. An interconnect system in accordance with claim 1, wherein said telephone patch interconnect unit further comprises means for selecting a mode of interconnect operation.

4. An interconnect system in accordance with claim 1, wherein said telephone patch interconnect unit further comprises means for detecting voice activity on the telephone line and activating the transmitter of said fixed transceiver when said detection occurs.

5. An interconnect system in accordance with claim 4, wherein said means for detecting voice activity further comprises means for varying the attack time of said detecting means.

6. An interconnect system in accordance with claim 4, wherein said means for detecting voice activity further comprises means for varying the hold time of said detecting means.

7. An interconnect system in accordance with claim 4, wherein said means for detecting voice activity further comprises means for varying the threshold of said detecting means thereby providing noise immunity.

8. An interconnect system in accordance with claim 4, wherein said means for detecting voice activity further comprises means for detecting busy tones on the telephone line and disconnecting the call.

9. An interconnect system in accordance with claim 1, wherein said means for monitoring the activity on the radio channel detects voice activity in the output of the receiver of said fixed transceiver.

10. An interconnect system in accordance with claim 1, wherein said remote unit further comprises means for signalling a transmission commencement to said telephone patch interconnect unit.

11. An interconnect system in accordance with claim 10, wherein said telephone patch interconnect unit further comprises means for detecting said transmission commencement signal.

12. An interconnect system in accordance with claim 1, wherein said remote unit further comprises means for signalling a transmission cessation to said telephone patch interconnection unit.

13. An interconnect system in accordance with claim 12, wherein said telephone patch interconnection unit further comprises means for detecting said transmission cessation signal.

14. An interconnect system in accordance with claim 13, wherein said telephone patch interconnection unit further comprises means for keying the transmitter of said fixed transceiver for a predetermined period of time following the activation of said means for detecting said transmission cessation signal.

15. An interconnect system in accordance with claim 1, wherein said remote unit further comprises means for simultaneously programming system parameters into said telephone patch interconnect unit and said remote unit.

16. An interconnect system in accordance with claim 1, wherein said remote unit further comprises means for storing digits corresponding to predetermined telephone numbers.

17. An interconnect system in accordance with claim 16, wherein said remote unit further comprises means for recalling said stored digits in response to a recall command.

18. An interconnect system in accordance with claim 1, wherein said telephone patch interconnect unit further comprises means for transferring a telephone call directed to a first remote unit to a designated second remote unit.

19. An interconnect system in accordance with claim 18, wherein said first remote unit comprises means for designating said second remote unit to the telephone patch interconnect unit.

20. A telephone patch interconnect unit for connecting a fixed transceiver of a two-way communications system operating on a radio channel and serving a plurality of uniquely identified remote units to a telephone line, comprising:
means for accepting dialed digits corresponding to a specific remote unit from the telephone line and encoding said dialed digits into a first data packet;
means for monitoring the activity on the radio channel received by the fixed transceiver;
means for coupling said first data packet to the fixed transceiver for transmission to the remote units when no activity is present on the radio channel thereby paging said specific remote unit;
means for accepting and acknowledging a second data packet transmitted from a remote unit and received by the fixed transceiver;
means for decoding said second data packet into telephone compatible digits and coupling said compatible digits to the telephone line thereby dialing a telephone number; and
means for coupling audio received from the fixed transceiver to the telephone line and for coupling audio from the telephone line to the fixed transceiver thereby enabling conversation to take place.

21. A telephone patch interconnect unit in accordance with claim 20, wherein said telephone patch interconnect unit further comprises means for selecting a mode of interconnect operation.

22. A telephone patch interconnect unit in accordance with claim 20, wherein said telephone patch interconnect unit further comprises means for detecting voice activity on the telephone line and activating the transmitter of the fixed transceiver when said detection occurs.

23. A telephone patch interconnect unit in accordance with claim 20, wherein said telephone patch interconnect unit further comprises means for detecting the commencement of transmission from a remote unit.

24. A telephone patch interconnect unit in accordance with claim 20, wherein said telephone patch interconnect unit further comprises means for detecting the cessation of transmission from a remote unit.

25. A telephone patch interconnect unit in accordance with claim 24, wherein said telephone patch interconnect unit further comprises means for keying the transmitter of said fixed transceiver for a predetermined period of time following the activation of said remote unit transmission cessation detector.

26. A telephone patch interconnect unit in accordance with claim 20, wherein said means for monitoring activity on the radio channel detects voice activity in the output of said fixed transceiver receiver.

27. A telephone patch interconnect unit in accordance with claim 20, wherein said means for monitoring radio channel activity further comprises means for varying the attack time of said detecting means.

28. A telephone patch interconnect unit in accordance with claim 20, wherein said means for monitoring radio channel activity further comprises means for varying the hold time of said detecting means.

29. A telephone patch interconnect unit in accordance with claim 20, wherein said means for monitoring radio channel activity further comprises means for varying the threshold of said detecting means thereby providing noise immunity.

30. A telephone patch interconnect unit in accordance with claim 20, wherein said telephone patch interconnect unit further comprises means for detecting busy tones on the telephone line and terminating a call on the telephone line.

31. A telephone patch interconnect unit in accordance with claim 20, wherein said telephone patch interconnect unit further comprises means for transferring said page from said specific remote unit to a designated second remote unit.

32. A remote telephone patch unit communicating with a telephone line via a fixed transceiver and a telephone line interconect device which encodes digits received from the telephone line into a first data packet for transmission on a two-way radio channel from the fixed transceiver, comprising:

a mobile radio transceiver having an associated unique identification digit sequence;

means for decoding into digits the first data packet received by said mobile radio transceiver and activating an alerting device if said decoded digits match said unique identification digit sequence thereby responding to a telephone call;

means for generating digits corresponding to a desired telephone number and storing said generated digits;

means for encoding said stored digits into a second data packet and transmitting said second data packet to the fixed transceiver thereby initiating a telephone call;

means for receiving an acknowledgement from the fixed transceiver indicating reception of said second data packet by the fixed transceiver;

means for repeating the transmission of said data packet a predeterminded number of times if said acknowledgement is not received;

means for transmitting a transmission commencement signal to the telephone line interconnect device at the beginning of each transmission;

means for transmitting a transmission cessation signal to the telephone line interconnect device at the end of each transmission; and means for instructing the telephone line interconnect device to transfer telephone calls from said remote telephone patch unit to a selected second remote telephone patch unit.

33. A remote telephone patch unit in accordance with claim 32, wherein said remote telephone patch unit further comprises a handset.

34. A remote telephone patch unit in accordance with claim 32, wherein said handset comprises means for simultaneously programming system parameters into said telephone line interconnect device and said remote telephone patch unit.

35. A remote telephone patch unit in accordance with claim 32, wherein said remote telephone patch unit further comprises means for recalling previously stored digits corresponding to a telephone number, encoding said previously stored digits, and transmitting said digits.

36. A method of accessing a telephone line by a remote unit and transmitting telephone numbers and a message via a two-way radio system consisting of a fixed station and at least one remote unit comprising the steps of:

generating and storing digits at the remote unit which correspond to a desired telephone number;

encoding said telephone number digits into a data packet;

transmitting said data packet to the fixed station;

receiving an acknowledgement from the fixed station indicating said data packet was received by the fixed station; and repeating the transmission of said data packet a predetermined number of times if said acknowledgement is not received.

37. A method for a two-way radio system of selectively calling one of a plurality of uniquely identified remote units and mediating a conversation via a telephone line interconnected fixed station comprising the steps of:

accepting dialed digits from the telephone line and encoding said dialed digits into a data packet;

monitoring the channel used by the radio system to determine if the channel is being used;

transmitting said data packet from the fixed station when said channel is determined to not be in use;

detecting a response from the selected remote unit and enabling an audio connection between the remote unit and the telephone line;

detecting a transmission cessation from the remote unit; and detecting audio activity on the telephone line and activating the fixed station transmitter in response thereto.

* * * * *